United States Patent
Hata

(10) Patent No.: US 11,316,337 B2
(45) Date of Patent: Apr. 26, 2022

(54) POWER SUPPLY APPARATUS THAT OUTPUTS VOLTAGE SUPPLIED TO LOAD

(71) Applicant: CANON KABUSHIKI KAISHA, Tokyo (JP)

(72) Inventor: Takayuki Hata, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 16/868,629

(22) Filed: May 7, 2020

(65) Prior Publication Data

US 2020/0366085 A1    Nov. 19, 2020

(30) Foreign Application Priority Data

May 14, 2019  (JP) .............................. JP2019-091614

(51) Int. Cl.
  *H02H 7/12*       (2006.01)
  *H02H 1/00*       (2006.01)
  *H05B 41/285*     (2006.01)

(52) U.S. Cl.
  CPC ............ *H02H 7/12* (2013.01); *H02H 1/0007* (2013.01); *H05B 41/2851* (2013.01)

(58) Field of Classification Search
  CPC ...... H02H 7/12; H02H 1/0007; H02H 11/006; H05B 41/2851

USPC ........................................................ 361/93.1
See application file for complete search history.

(56) References Cited

U.S. PATENT DOCUMENTS

| 10,747,158 B2* | 8/2020 | Nakajima | ................ H02H 7/20 |
| 2013/0169990 A1* | 7/2013 | Yoshioka | ........... H04N 1/00901 |
| | | | 358/1.14 |
| 2016/0202643 A1* | 7/2016 | Nakajima | ............... G03G 15/80 |
| | | | 399/9 |
| 2018/0026524 A1* | 1/2018 | Kasamatsu | ............. H02M 1/36 |
| | | | 323/215 |

FOREIGN PATENT DOCUMENTS

JP      2003-208062 A      7/2003

* cited by examiner

*Primary Examiner* — Yemane Mehari
(74) *Attorney, Agent, or Firm* — Venable LLP

(57) ABSTRACT

A processor starts output of a drive signal prior to output of a control signal. The processor determines a fault related to the drive signal based on a detection signal outputted from a detection circuit. In a case where a fault related to the drive signal is not detected, the processor starts output of the control signal. In a case where a fault related to the drive signal is detected, the processor stops output of the drive signal.

25 Claims, 17 Drawing Sheets

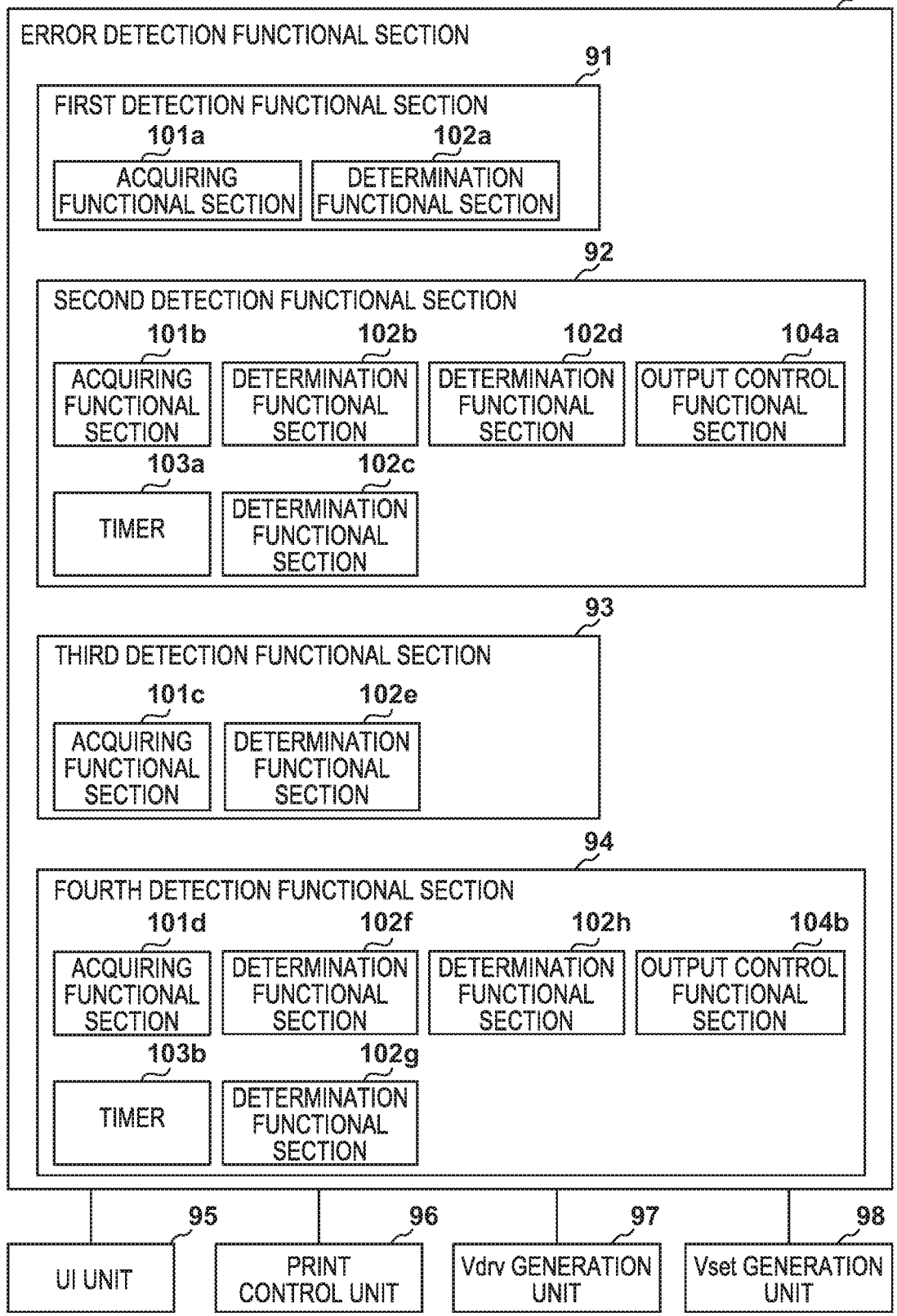

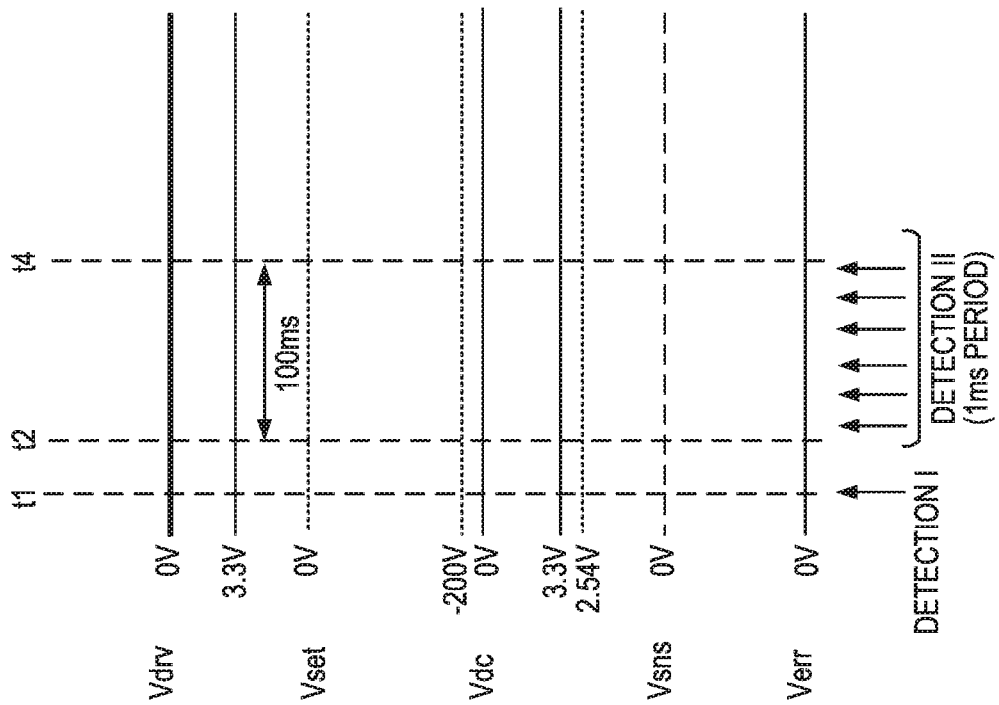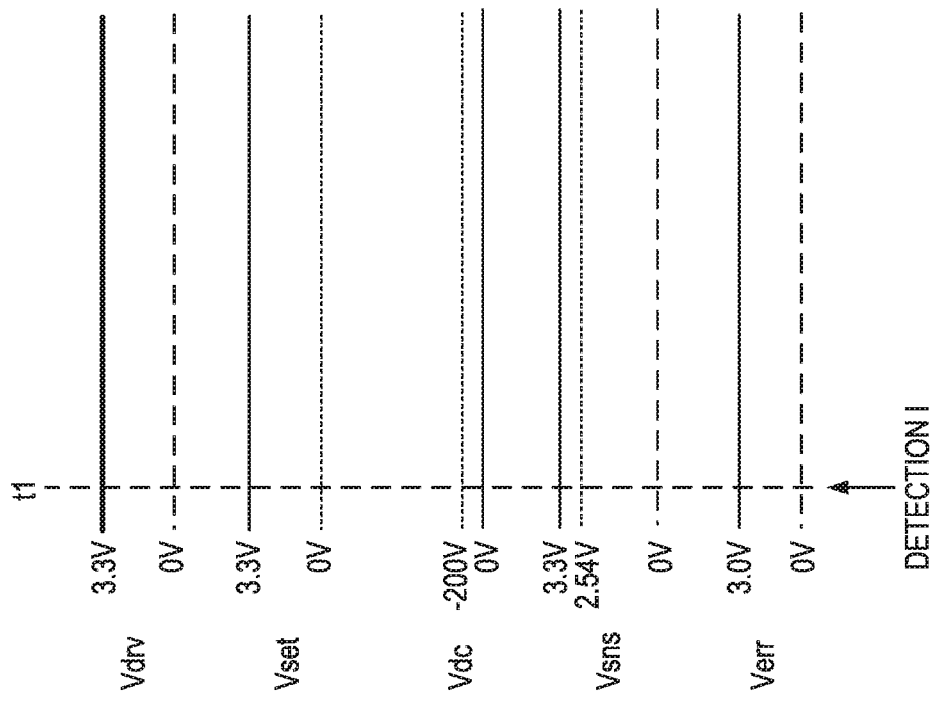

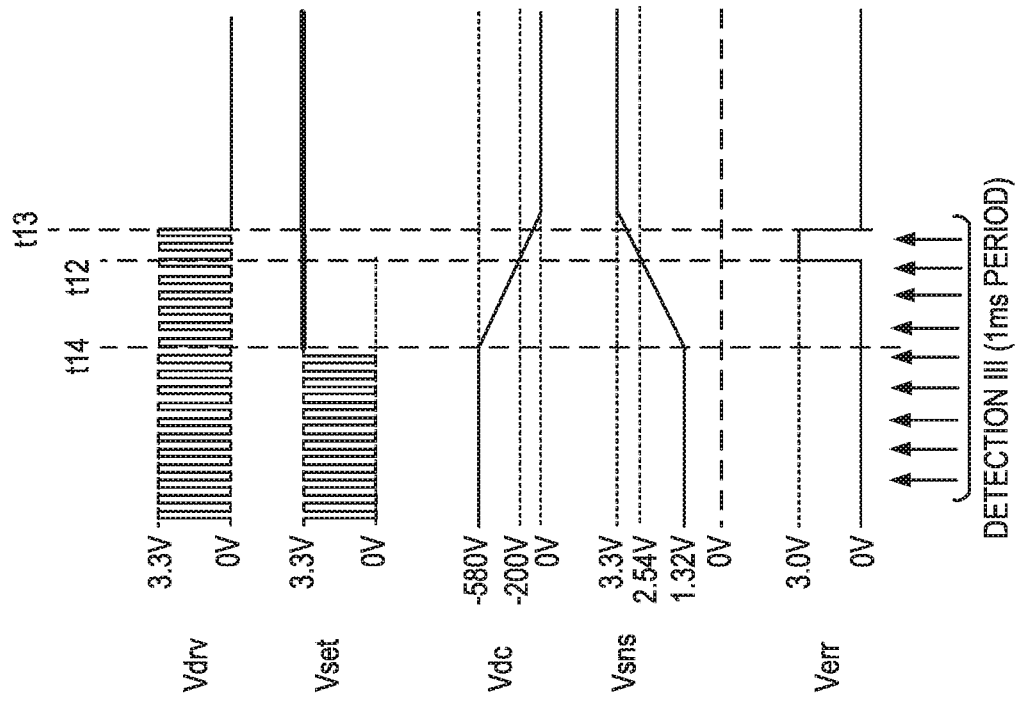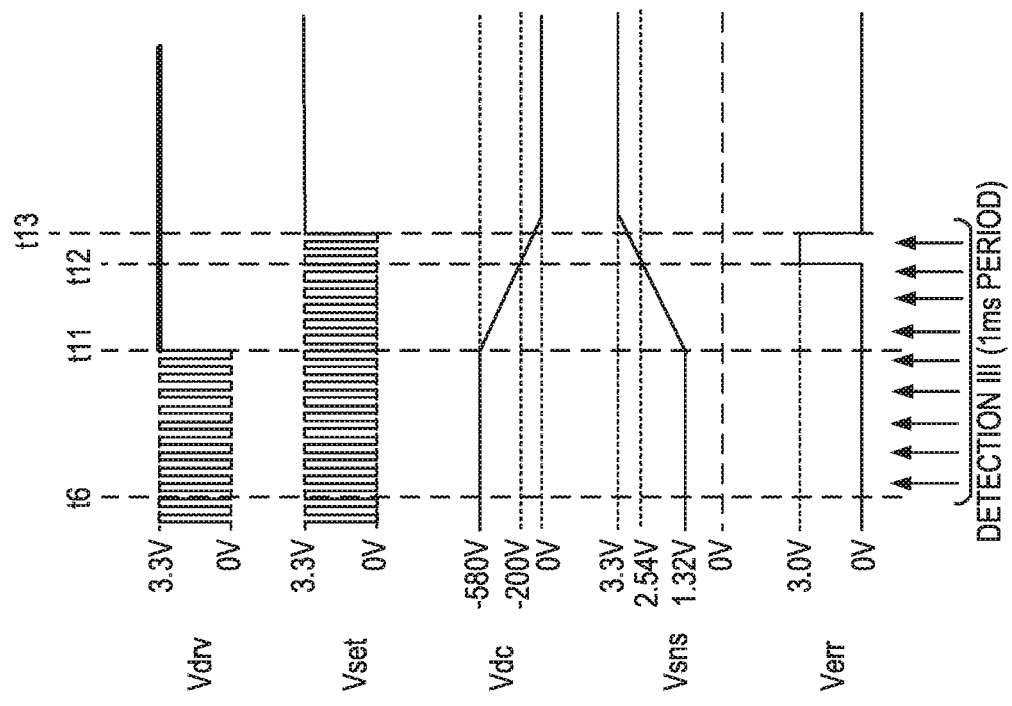

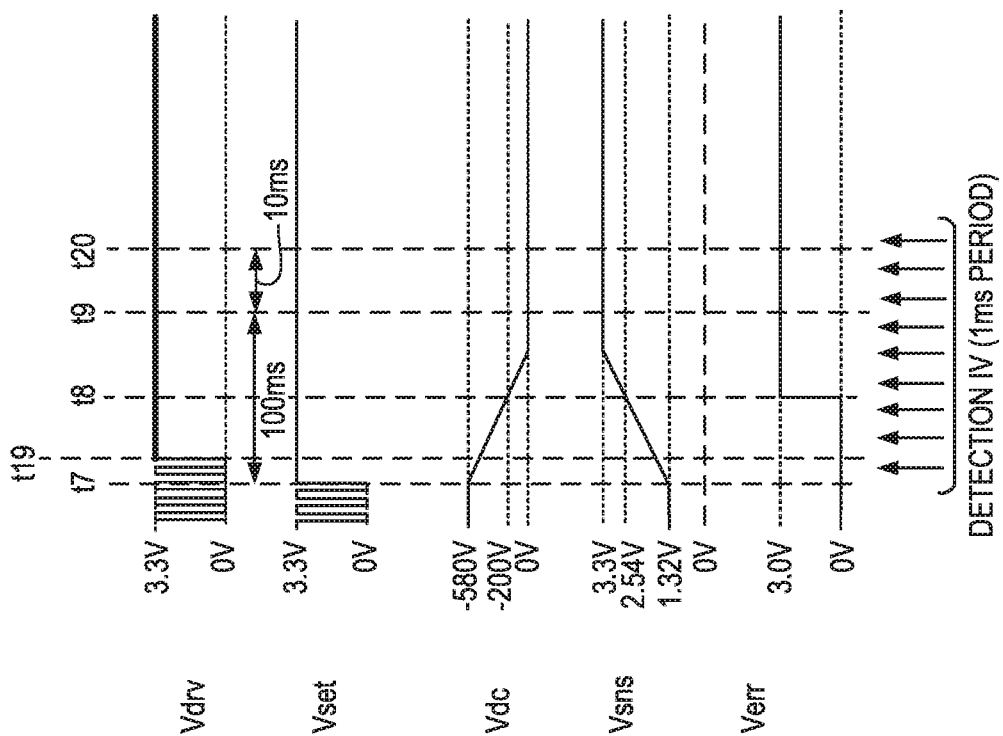
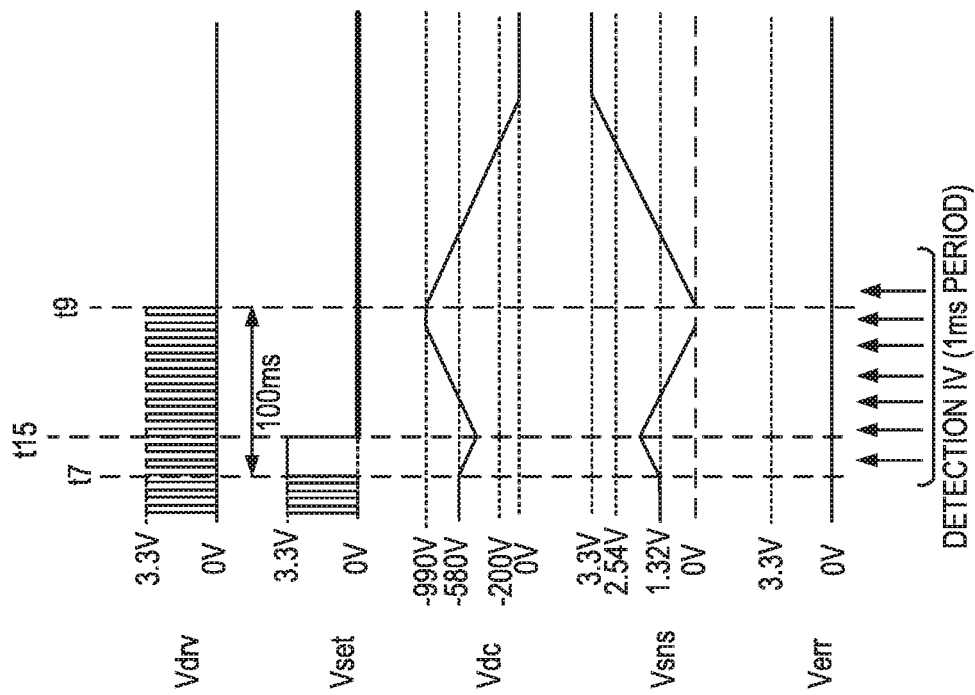

POWER SUPPLY APPARATUS THAT OUTPUTS VOLTAGE SUPPLIED TO LOAD

BACKGROUND OF THE INVENTION

Field of the Invention

The present invention relates to a power supply apparatus that outputs a voltage that is to be supplied to a load.

Description of the Related Art

A power supply apparatus used in an electrophotographic image forming apparatus generates various high voltages (charging voltage, developing voltage, transfer voltage, and the like) according to an electrophotographic process. If these voltages cease to be appropriate, the quality of an image to be output by the image forming apparatus may deteriorate. Japanese Patent Laid-Open No. 2003-208062 proposes detecting a current flowing through a photosensitive member and determining an abnormal output of a high-voltage power supply based on a detected value.

Incidentally, a cause of an inappropriate output voltage from a power supply apparatus can be considered to be not only a fault of the power supply apparatus, but also an abnormality of a drive signal or a control signal that is inputted to the power supply apparatus. In particular, if an abnormality occurs in the drive signal, it is possible for a primary side of a transformer in the power supply apparatus to remain conductive, a large current to flow to an electronic component in the power supply apparatus, and for the electronic component to have a fault.

SUMMARY OF THE INVENTION

The present invention provides a power supply apparatus for outputting a voltage to be supplied to a load. The apparatus may comprise the following elements. At least one processor generates a control signal for setting a target voltage to be outputted and a drive signal for driving an element of the power supply apparatus to output the target voltage. A power supply circuit, upon being inputted with the drive signal and the control signal, starts generation of an output voltage based on the target voltage specified by the control signal. A detection circuit generates a detection signal used for determination of a fault related to the drive signal based on the drive signal and the output voltage outputted from the power supply circuit. The at least one processor starts output of the drive signal prior to output of the control signal, in a time period where the output of the control signal is not being performed, determines a fault related to the drive signal based on the detection signal outputted from the detection circuit, and if a fault related to the drive signal is not detected, starts output of the control signal, and if a fault related to the drive signal is detected, stops output of the drive signal.

Further features of the present invention will become apparent from the following description of exemplary embodiments (with reference to the attached drawings).

BRIEF DESCRIPTION OF THE DRAWINGS

FIG. 8 is a diagram for describing function of a CPU.
FIGS. 10A and 10B are diagrams for describing an anomaly detected by detection I or the like.
FIGS. 12A and 12B are diagrams for describing an anomaly detected by detection II or the like.
FIGS. 13A and 13B are diagrams for describing an anomaly detected by detection III or the like.
FIGS. 15A and 15B are diagrams for describing an anomaly detected by detection IV.

DESCRIPTION OF THE EMBODIMENTS

Figure 1:
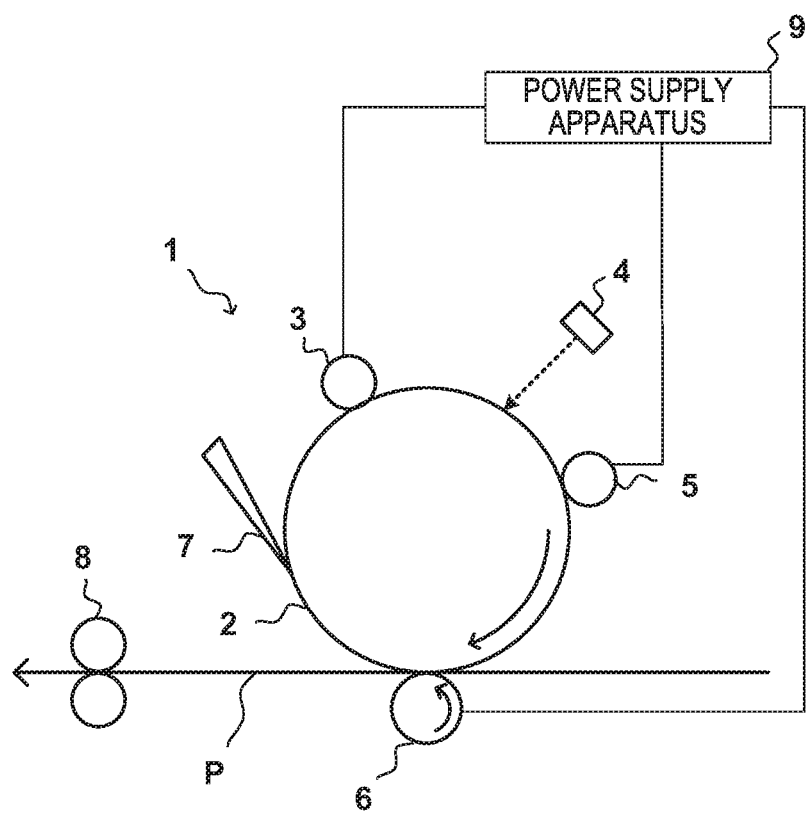
FIG. 1 is a diagram illustrating an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

<Image Forming Apparatus>

As shown in FIG. 1, an electrophotographic image forming apparatus 1 includes a photosensitive drum 2 that is driven to rotate in the arrow direction. The photosensitive drum 2 functions as an image carrier for carrying an electrostatic latent image and a toner image. A charging roller 3 is a charger for charging the surface of the photosensitive drum 2 so that the surface of the photosensitive drum 2 has a uniform potential by using a charging voltage. A laser scanner 4 is an exposure device (optical scanning apparatus) that forms an electrostatic latent image on the surface of the photosensitive drum 2 by irradiating the surface of the photosensitive drum 2 with a laser beam. A developing roller 5 is a developing device for forming a toner image by adhering toner to an electrostatic latent image using a developing voltage. The developing roller 5 may be referred to as a developing sleeve. A transfer roller 6 is a transfer member that transfers the toner image to the intermediate transfer member or the sheet P using a transfer voltage. A cleaning device 7 removes the toner remaining on the photosensitive drum 2. A fixing device 8 applies heat and pressure to the toner image and the sheet P to fix the toner image to the sheet P. A power supply apparatus 9 generates a charging voltage, a developing voltage, and a transfer voltage, and supplies the generated voltages to the image forming apparatus 1. In this manner, the photosensitive drum 2, the charging roller 3, the laser scanner 4, the developing roller 5, and the transfer roller 6 function as an image forming unit for forming a toner image on the sheet P.

<Power Supply Apparatus>

Figure 2:
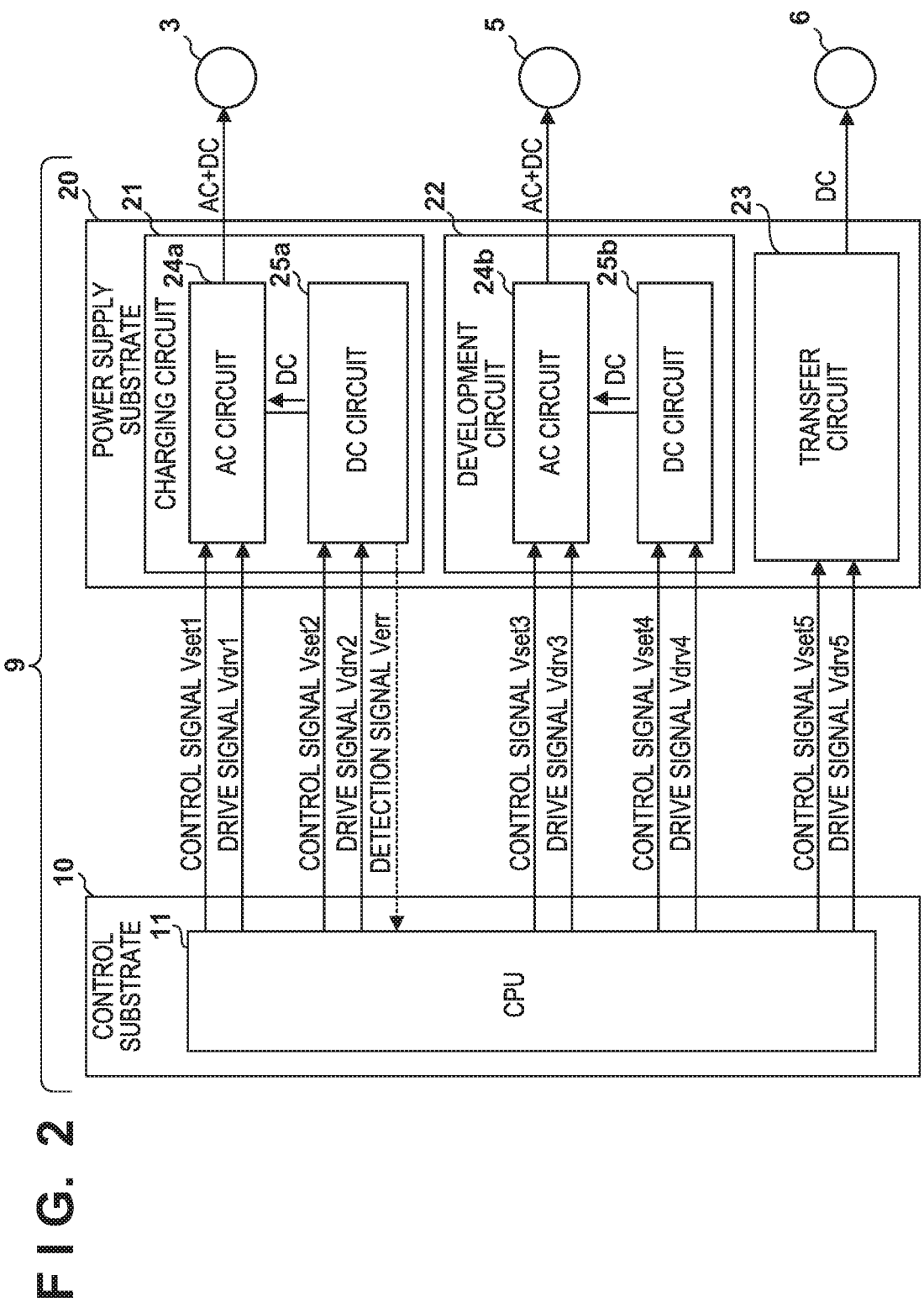
FIG. 2 is a diagram showing a power supply apparatus.

FIG. 2 shows a control substrate 10 and a power supply substrate 20 that make up the power supply apparatus 9. The control substrate 10 has a CPU 11 for outputting a control signal Vset and a drive signal Vdrv to the power supply substrate 20. At least one processor that includes the CPU 11 may be mounted on the control substrate 10. The control signal Vset is a signal for setting a target voltage. The drive signal Vdrv is a signal for driving a transformer or the like. The power supply substrate 20 includes a charging circuit 21, a development circuit 22, and a transfer circuit 23. The charging circuit 21 is a power supply circuit that generates a charging voltage comprising an AC voltage and a DC voltage. The development circuit 22 is a power supply circuit that generates a developing voltage comprising an AC voltage and a DC voltage. The transfer circuit 23 is a power supply circuit that generates a transfer voltage that comprises a direct current voltage. As described above, the power supply circuit according to the present embodiment is a circuit that generates an output voltage by being supplied with a drive signal and a control signal.

The charging circuit 21 is a power supply circuit having an AC circuit 24a for generating an AC voltage and a DC circuit 25a for generating a DC voltage. The AC circuit 24a is a power supply circuit that generates AC voltages in accordance with a control signal Vset1 and a drive signal Vdrv1 outputted from the CPU 11. The DC circuit 25a is a power supply circuit that generates a DC voltage in accordance with a control signal Vset2 and a drive signal Vdrv2 outputted from the CPU 11. The charging circuit 21 supplies the charging roller 3 with a charging voltage resulting from overlapping an AC voltage outputted from the AC circuit 24a and a DC voltage outputted from the DC circuit 25a. In the present embodiment, the DC circuit 25a is a constant voltage circuit.

The development circuit 22 has an AC circuit 24b for generating an AC voltage and a DC circuit 25b for generating a DC voltage. The AC circuit 24b generates AC voltages in accordance with a control signal Vset3 and a drive signal Vdrv3 outputted from the CPU 11. The DC circuit 25a generates a DC voltage in accordance with a control signal Vset4 and a drive signal Vdrv4 outputted from the CPU 11. The development circuit 22 supplies the developing roller 5 with a developing voltage resulting from overlapping the AC voltage outputted from the AC circuit 24b and the DC voltage outputted from the DC circuit 25b.

The transfer circuit 23 that generates a DC transfer voltage in accordance with a control signal Vset5 and a drive signal Vdrv5 outputted from the CPU 11, and supplies the transfer voltage to the transfer roller 6. Control signals Vset1, Vset2, Vset3, Vset4, Vset5 are collectively referred to as a control signal Vset. The control signal Vset is, for example, a PWM signal. PWM is an abbreviation for pulse width modulation. Similarly, drive signals Vdrv1, Vdrv2, Vdrv3, Vdrv4, and Vdrv5 are collectively referred to as a drive signal Vdrv. The drive signal Vdrv is a rectangular wave and is a clock signal for driving a so-called transformer.

A detection signal Verr is a signal useful for determining the presence or absence of fault related to the drive signal Vdrv, the control signal Vset, and a power supply circuit. Here, a fault related to the drive signal Vdrv is a state where the drive signal Vdrv is not normal (abnormal). Here, a fault related to the control signal Vset is a state where the control signal Vset is not normal (is abnormal). In this example, the DC circuit 25a outputs the detection signal Verr, but the AC circuits 24a and 24b, the DC circuit 25b, and the transfer circuit 23 may also be configured to output the detection signal Verr. Hereinafter, an example will be described in which the DC circuit 25a outputs the detection signal Verr as a representative of the AC circuits 24a and 24b, the DC circuits 25a and 25b, and the transfer circuit 23. However, description related to the DC circuit 25a also directly applies to the AC circuits 24a and 24b, the DC circuit 25b, and the transfer circuit 23. The DC circuits 25a and 25b may be collectively referred to as a DC circuit 25. The AC circuits 24a and 24b may be collectively referred to as an AC circuit 24.

<Charging Circuit>

Figure 3:
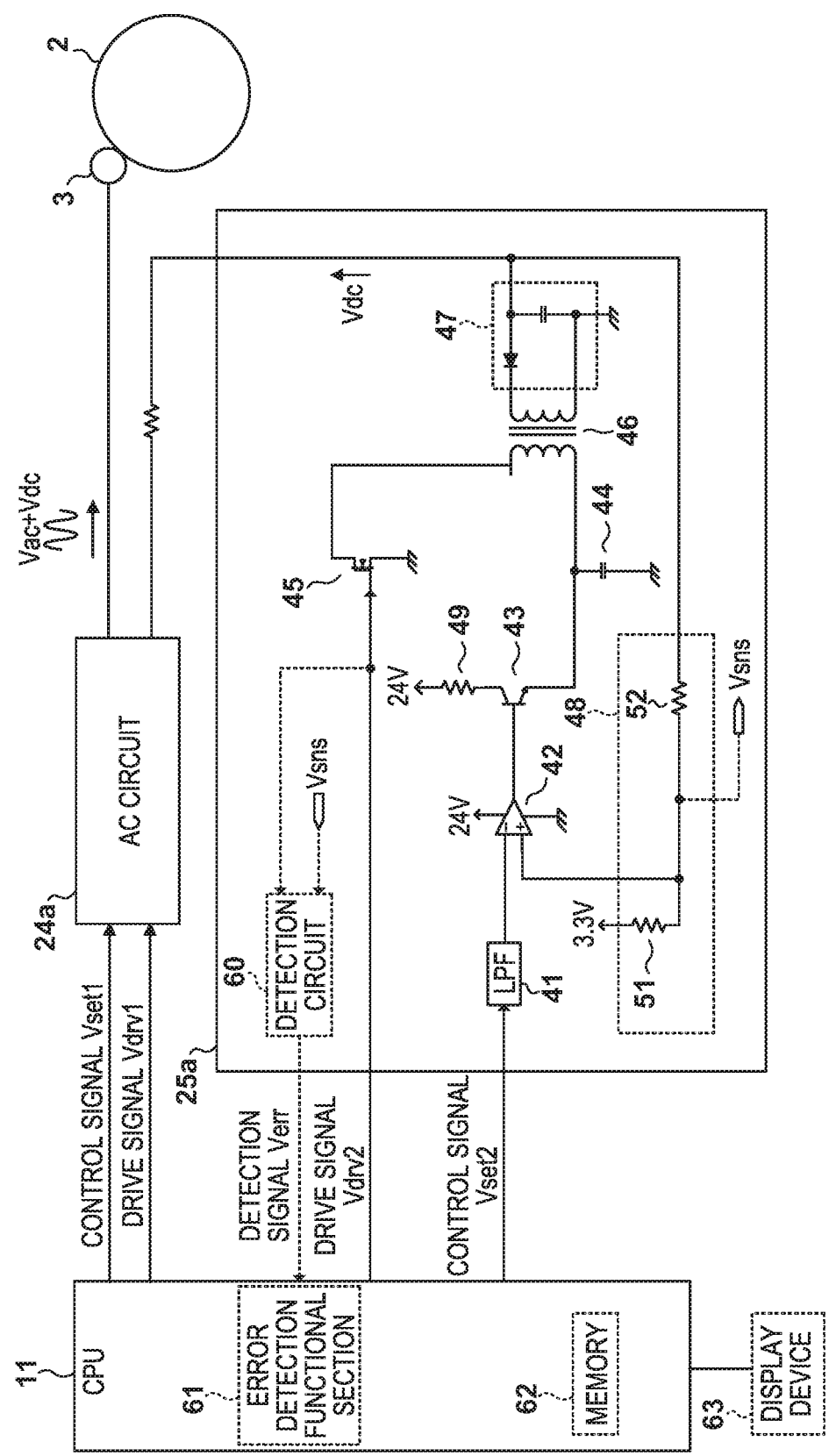
FIG. 3 is a circuit diagram showing a power supply circuit.

FIG. 3 shows an example of the charging circuit 21. The DC circuit 25 has a rectifying and smoothing circuit 47 on the secondary side of a transformer 46, but the AC circuit 24 does not have a rectifying and smoothing circuit on the secondary side. Since the DC circuit 25 and the AC circuit 24 are similar to each other, the DC circuit 25 will be mainly described below. The development circuit 22 is similar to the charging circuit 21. Similarly, the transfer circuit 23 is similar to the DC circuit 25. Therefore, the DC circuit 25 will be mainly described below. For simplicity of description, the drive signal Vdrv2 is denoted as Vdrv and the control signal Vset2 is denoted as Vset.

An LPF 41 is a low-pass filter (conversion circuit) for converting the control signal Vset outputted from the CPU 11 into a DC voltage. The DC voltage after the conversion by an LPF 41 is a reference value corresponding to the target voltage of the output voltage Vdc. When the voltage of the control signal Vset is constantly low (e.g., 0V), the output voltage Vdc is maximized. On the other hand, when the control signal Vset is High (3.3V) at all times, the output voltage Vdc becomes 0V (output stopped).

An error amplifier 42 is connected to the subsequent stage of the LPF 41. The error amplifier 42 generates a base signal such that a feedback voltage Vsns outputted from a feedback circuit 48 approaches a reference value, and supplies the base signal to the base of a transistor 43. As a result, the output voltage Vdc is maintained at the target voltage. The transistor 43 is a transistor for amplifying a current. The transistor 43 amplifies the current outputted from the error amplifier 42 and outputs the amplified current. A capacitor 44 is connected between the emitter of the transistor 43 and ground (ground potential). The capacitor 44 generates an input voltage based on the current and applies the input voltage to one end of the primary side coil of the transformer 46. An FET 45 is a switching element for driving the transformer 46 in accordance with the drive signal Vdrv inputted to the gate. The FET 45 switches an input voltage (primary side voltage) applied to the transformer 46 according to the drive signal Vdrv. As a result, a secondary side voltage is generated in the coil on the secondary side of the transformer 46. The rectifying and smoothing circuit 47 is connected to the coil on the secondary side of the transformer 46. The rectifying and smoothing circuit 47 rectifies and smooths the AC voltage generated in the secondary side of the coil of the transformer 46 to generate a direct current voltage (output voltage Vdc). The output voltage Vdc is outputted to the AC circuit 24.

The feedback circuit 48 is a voltage dividing circuit formed by resistors 51 and 52, and generates the feedback voltage Vsns by dividing the output voltage Vdc. When the output voltage Vdc is 0V, the feedback voltage Vsns is 3.3V.

The AC circuit 24a generates an AC voltage (output voltage Vac) based on a control signal Vset1 and a drive signal Vdrv1 outputted from the CPU 11. The AC circuit 24a overlaps the output voltage Vdc outputted from the DC circuit 25a onto the output voltage Vac to generate a charging voltage, and supplies the charging voltage to the charging roller 3.

A detection circuit 60 is a circuit that generates a detection signal Verr based on the drive signal Vdrv and the feedback voltage Vsns. The CPU 11 executes control programs stored in the ROM area of a memory 62, thereby realizing various functions (for example, an error detection functional section 61). Based on the detection signal Verr, the error detection functional section 61 determines the presence or absence of a fault related to the drive signal Vdrv, the control signal Vset, or the power supply circuits. A display device 63 displays a determination result.

When DC Circuit is Operating Normally

Figure 4A:
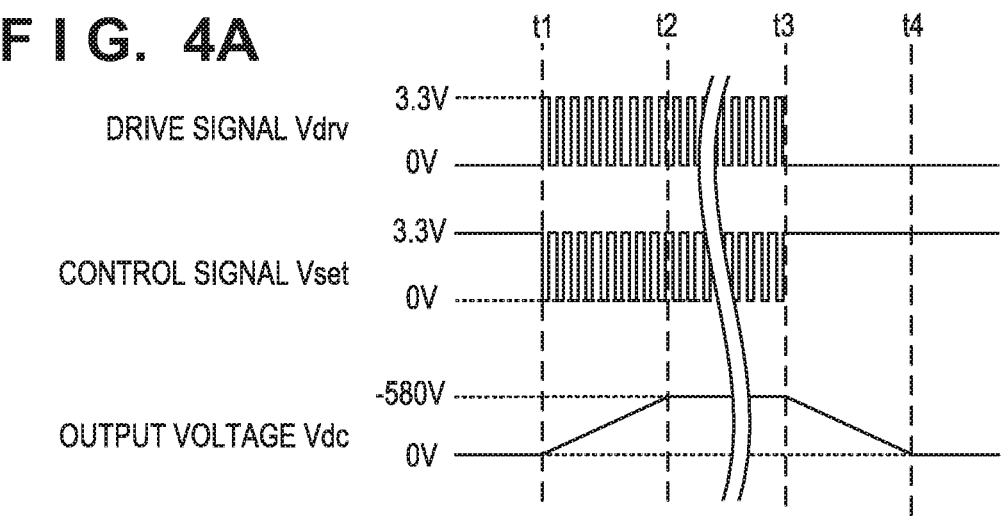
FIGS. 4A to 4C are diagrams for describing a relation between a drive signal, a control signal and an output voltage.

As shown by FIG. 4A, at timing t1, the CPU 11 simultaneously starts the output of the drive signal Vdrv and the output of the control signal Vset. As a result, the DC circuit 25 starts outputting the output voltage Vdc. At timing t2, the output voltage Vdc stabilizes at −580V based on the control signal Vset. As a result, the image forming apparatus 1 enters a state where it can start a print job. At timing t3, the CPU 11 terminates the print job. The CPU 11 simultaneously stops the output of the drive signal Vdrv and the output of the control signal Vset. As a result, the output voltage Vdc starts to decrease. At timing t4, the output voltage Vdc becomes 0V.

When DC Circuit is not Operating Normally

Figure 4B:
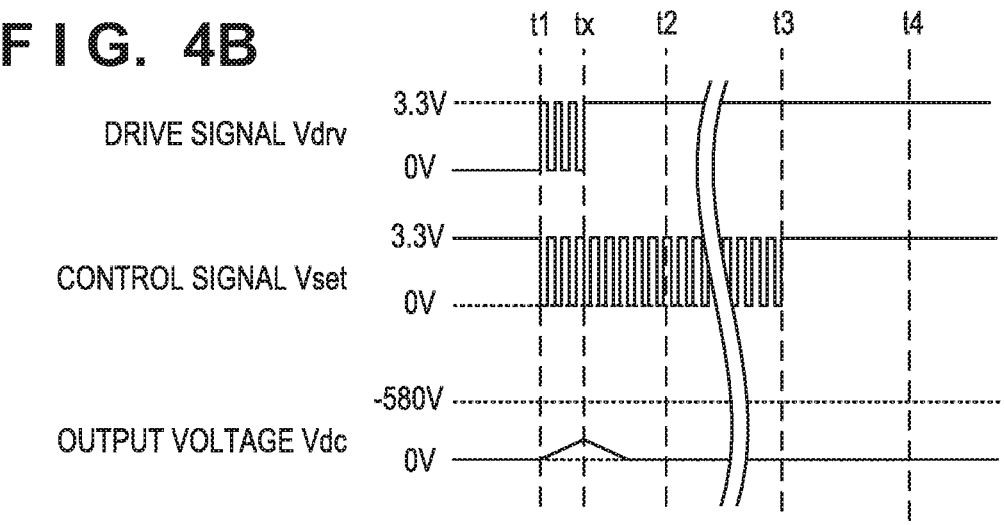
Figure 4C:
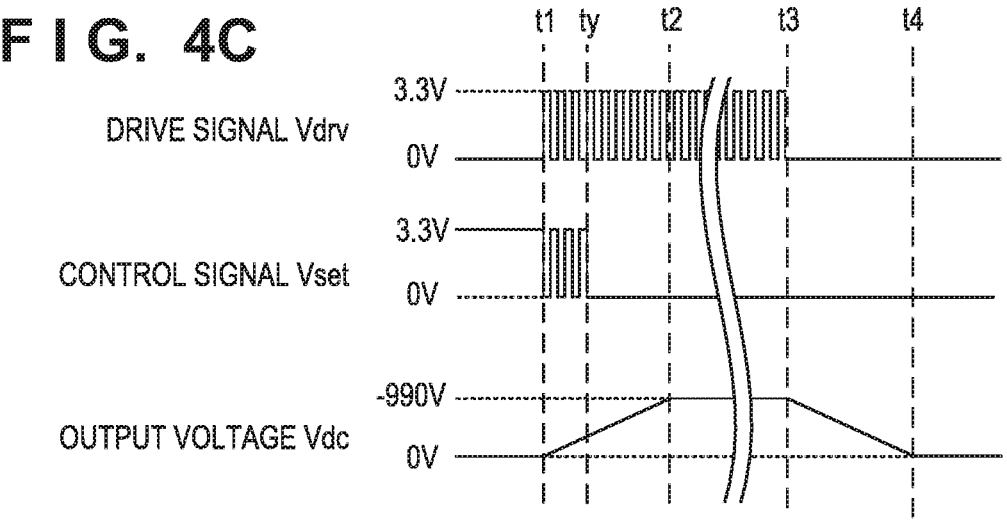

FIG. 4B shows an example in which the drive signal Vdrv is fixed to a High level. FIG. 4C shows an example in which the control signal Vset is fixed to a Low level. In FIG. 4B, the drive signal Vdrv is fixed to a High level at timing tx between timing t1 and timing t2. In such a case, the drive signal Vdrv ceases to be able to drive the transformer 46. The output voltage Vdc starts to decrease without reaching the target voltage of −580V. That is, the output voltage Vdc is not outputted normally despite the DC circuit 25 not having a fault. In addition, since, in this case, a large current flows through the transistor 43 and the FET 45, it is possible for these to break. Therefore, it is essential to detect a fault related to the drive signal Vdrv.

In FIG. 4C, the control signal Vset is fixed to a Low level at timing tx between timing t1 and timing t2. In this case, the output voltage Vdc exceeds the target voltage of −580V and becomes the maximum output (e.g., −990 V). Further, a large current for outputting −990V flows through the transistor 43 and the FET 45, so it is possible for these to break. Therefore, it is essential to detect a fault related to the control signal Vset.

<Error Detection>

The detection circuit 60 detects an abnormality of the output voltage Vdc applied to the charging roller 3, an abnormality of the control signal Vset2, or an abnormality of the drive signal Vdrv2, and outputs a detection signal Verr indicating the detection result to the CPU 11. The error detection functional section 61 determines the presence or absence of a fault related to the DC circuit 25a, a fault related to the control signal Vset, or a fault related to the drive signal Vdrv based on the detection signal Verr. The error detection functional section 61 identifies a part where a fault has occurred (control signal, drive signal, or power supply circuit) based on the detection signal Verr, and stores a result of the identification in the memory 62. The drive signal Vdrv and the feedback voltage Vsns are inputted to the detection circuit 60. The feedback voltage Vsns is a voltage that is proportional to the output voltage Vdc. A detection circuit 60 generates and outputs a detection signal Verr based on a combination of the drive signal Vdrv and the feedback voltage Vsns.

Operation of the Drive Signal Detection Circuit

Figure 5:
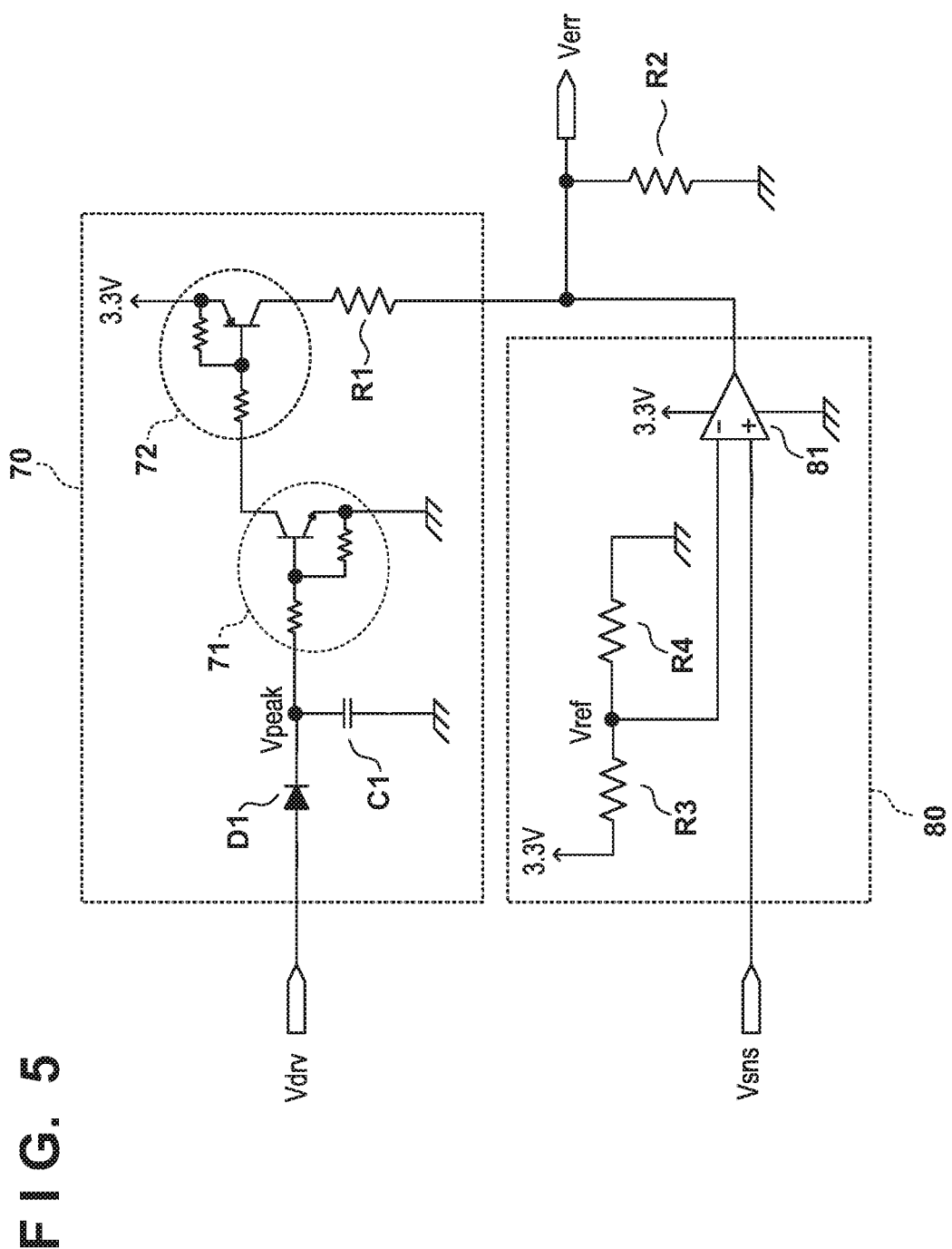
FIG. 5 is a circuit diagram for describing a detection circuit.

FIG. 5 is a detailed circuit diagram of the detection circuit 60. As shown in FIG. 5, the detection circuit 60 includes a drive signal detection circuit 70 and an output detection circuit 80. In the drive signal detection circuit 70, a diode D1 and a capacitor C1 form a peak hold circuit. The peak hold circuits are configured to hold an amplitude voltage of the drive signal Vdrv. For example, the amplitude voltage of the drive signal Vdrv is 3.3V. When the normal drive signal Vdrv is inputted, the peak hold output Vpeak which is outputted from the peak hold circuit is 3.3V. When the peak hold output Vpeak becomes 3.3V, an npn type digital transistor 71 connected to the subsequent stage of the peak hold circuit changes from the off state to the on state. When the digital transistor 71 enters the on state, a pnp type digital transistor 72 located at the subsequent stage enters the on state from the off state. When the digital transistor 72 enters the on state, a voltage generated by dividing 3.3V by resistors R1 and R2 is outputted as the detection signal Verr. The resistor R1 is a current-limiting resistor. The resistor R2 is a pull-down resistor. The detection signal Verr is a binary signal inputted to a digital input port of the CPU 11. Here, a High level of the detection signal Verr is 3.0V.

Operation of the Output Detection Circuit 80

As shown in FIG. 5, the feedback voltage Vsns outputted from the feedback circuit 48 is inputted to one terminal (+ terminal) of the comparator 81. A reference voltage Vref is inputted to the other terminal (− terminal) of the comparator 81 as a threshold. A resistor R3 and a resistor R4 generate a reference voltage Vref by dividing 3.3V. If Vsns is greater than Vref, the output terminal of the comparator 81 becomes Hi-Z (open), so that the detection signal Verr is not affected by the feedback voltage Vsns. That is, in the detection signal Verr, the detection result of the drive signal Vdrv becomes dominant. When the output voltage Vdc is not being outputted in this manner (when the control signal Vset is not being outputted), the detection signal Verr indicates the detection result of the drive signal Vdrv. When the output voltage Vdc is outputted and so that Vsns becomes equal to or lower than Vref, the output terminal of the comparator 81 outputs a Low level voltage. That is, the level of the detection signal Verr is determined to be the Low level. The reference voltage Vref is set to a voltage for determining the presence or absence of the output voltage Vdc. In the present embodiment, when the output voltage Vdc is −200V, the feedback voltage Vsns is 2.54V. Therefore, the resistors R3 and R4 are respectively selected so that the reference voltage Vref is set to 2.54V. If the output voltage Vdc is of greater magnitude than −200V (e.g., −580 V), the comparator 81 determines that there is an output voltage Vdc. The magnitude relationship here is determined by an absolute value that removes a negative sign. In the present embodiment, that the output voltage Vdc being of lower magnitude than a threshold (e.g., −200V) is also treated to mean that the output voltage Vdc is absent.

<Detection Sequence>

Figure 6:
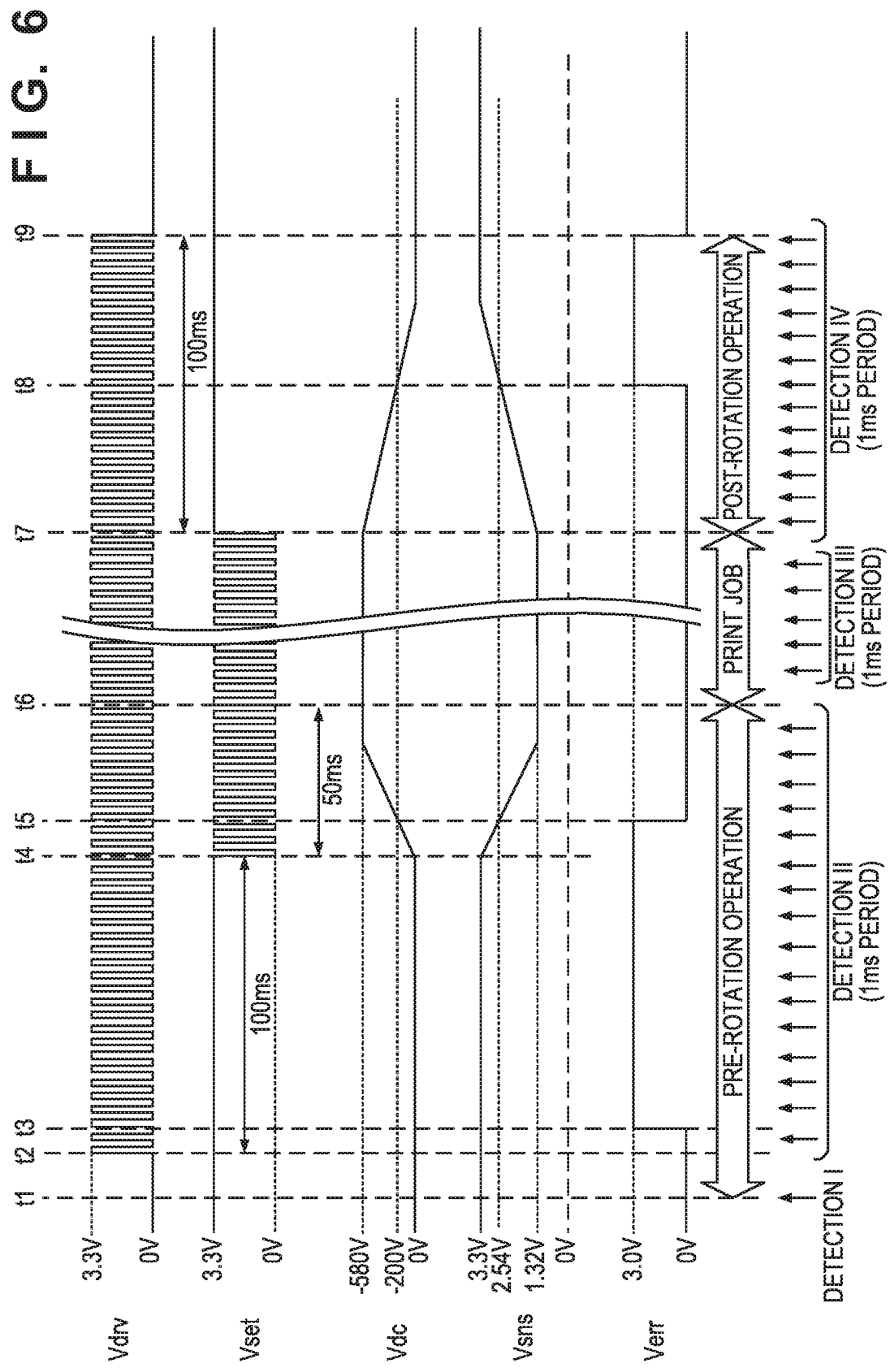
FIG. 6 is a diagram for describing detection I to IV.

FIG. 6 is a timing chart showing a fault detection method according to the present embodiment. In FIG. 6, an ideal state is shown, in which an error (abnormality or fault) has not been detected. When a print job is accepted, the image forming apparatus 1 executes a pre-rotation operation, the print job, and a post-rotation operation in that order. The pre-rotation operation is a preparation operation for image formation, such as starting the rotation of the photosensitive drum 2. The post-rotation operation is, for example, an operation of discharging a sheet P for ending the image forming process. In the pre-rotation operation, the output voltage Vdc rises to a target voltage. In the post-rotation operation, stopping of the output voltage Vdc is performed. In the present embodiment, there are four detection sequences corresponding to the operation state of the image forming apparatus 1.

Detection I

Detection I is a detection sequence which is executed immediately after the start of the pre-rotation operation (timing t1) and in a state where the drive signal Vdrv is not being outputted and the control signal Vset is not being outputted. The detection I detects a fault related to the drive signal Vdrv (e.g. Vdrv being fixed to High). In the detection I, the detection signal Verr is acquired at least once.

Detection II

Detection II is a detection sequence that is executed every 1 msec during the execution of the pre-rotation operation. In particular, it is characteristic that the drive signal Vdrv is output first, and the control signal Vset is output later. This is in order to detect a fault related to the drive signal Vdrv. When no error is detected at the timing t1, output of the drive signal Vdrv is started at the timing t2. At timing t3, the detection signal Verr becomes High in accordance with the outputting of the drive signal Vdrv. At this point in time, because the control signal Vset is not being outputted, the detection result of the output detection circuit 80 does not affect the detection signal Verr. At timing t4, output of the control signal Vset is started. As a result, the output voltage Vdc rises toward the target voltage. A predetermined period of time from the timing t2 to the timing t4 is, for example, 100 ms. This period of time is decided based on the period of time required for CPU 11 to detect a fault related to the drive signal Vdrv. Since the magnitude of the feedback voltage Vsns becomes equal to or lower than the reference voltage Vref at the timing t5, the detection signal Verr forcibly becomes Low. In other words, since the magnitude of the output voltage Vdc exceeds −200V, the detection signal Verr forcibly becomes Low. A predetermined period of time from the timing t5 to the timing t6 is, for example, 50 ms. The 50 ms is decided based on the period of time required for the output voltage Vdc to rise from 0V to the target voltage. In the detection II, a fault related to the drive signal Vdrv, a fault related to the control signal Vset, and a fault of the power supply circuits are detected.

Detection III

Detection III is a detection sequence that is executed every 1 msec during the execution of the print job. In the detection III, a fault related to the drive signal Vdrv, a fault related to the control signal Vset, and a fault of the power supply circuits are detected.

Detection IV

Detection IV is a detection sequence that is executed every 1 msec during the execution of the post-rotation operation. At timing t7, output of the control signal Vset is stopped. With this, the output voltage Vdc starts to fall. At timing t8, the feedback voltage Vsns exceeds the reference voltage Vref. At timing t8, the drive signal Vdrv is also being outputted. Therefore, the detection signal Verr becomes High. Because the drive signal Vdrv stops at the timing t9, the detection signal Verr becomes Low. In the detection IV, a fault related to the drive signal Vdrv, a fault related to the control signal Vset, and a fault of the power supply circuits are detected.

<Flow Chart>

Figure 7:
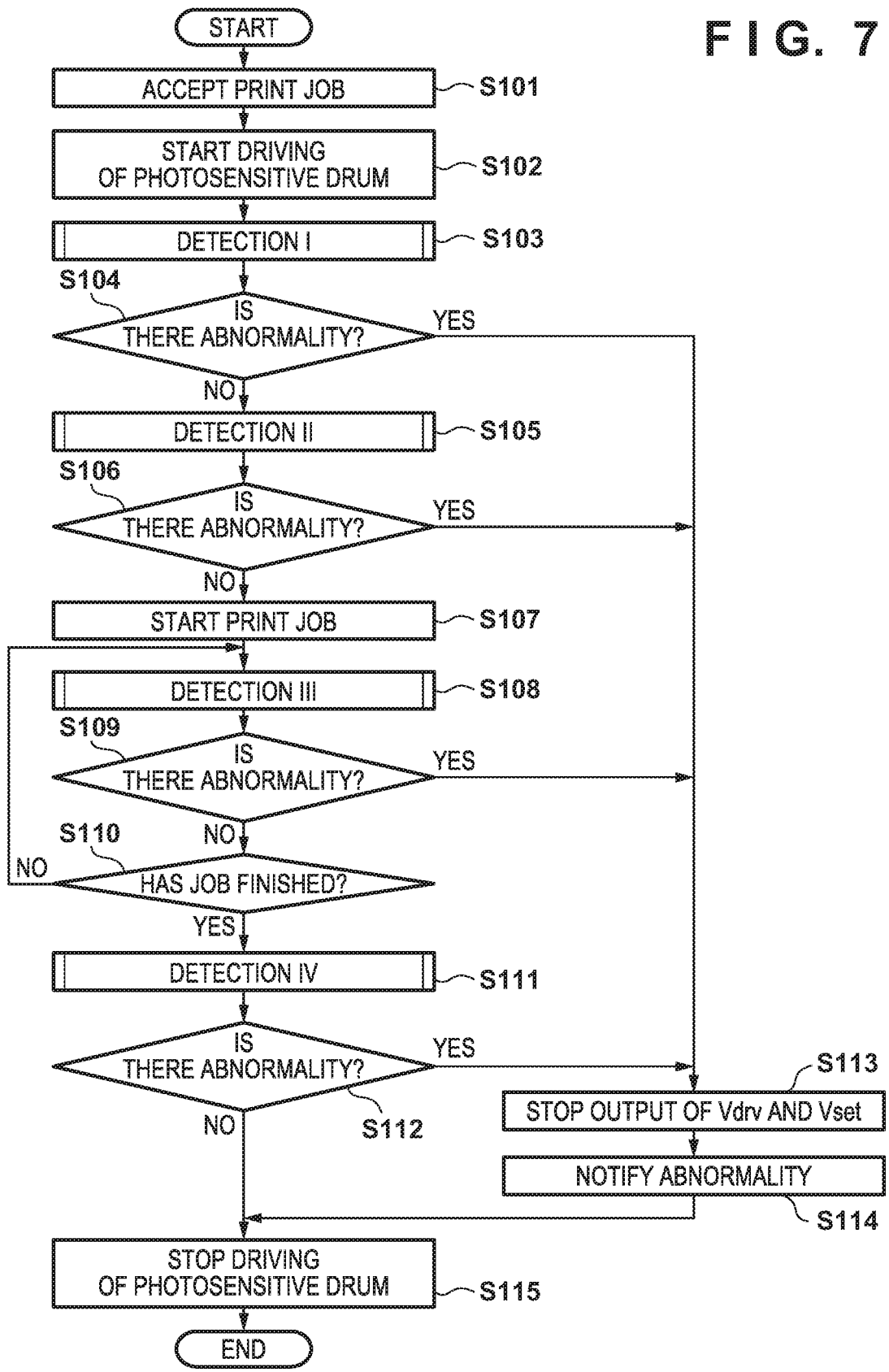
FIG. 7 is a flow chart for describing a fault detection method.

FIG. 7 is a flow chart showing an error detection method that the CPU 11 executes.

In step S101, the CPU 11 accepts a print job inputted from a host computer or the like.

In step S102, the CPU 11 starts driving the photosensitive drum 2.

In step S103, the CPU 11 executes the detection I. Details of the detection I will be described later.

In step S104, the CPU 11 determines whether or not an abnormality (fault) related to the drive signal Vdrv has been detected based on a result of executing the detection I. If an anomaly is detected, the CPU 11 advances the processing to step S113. In step S113, the CPU 11 stops outputting the drive signal Vdrv and the control signal Vset. It should be noted that the output of the drive signal Vdrv and the control signal Vset may be stopped before step S113. In step S114, the CPU 11 makes a notification of an abnormality. For example, the CPU 11 outputs to the display device 63 a notification indicating that an anomaly has been detected. In step S115, the CPU 11 stops the photosensitive drum 2. If an anomaly is not detected in step S104, the CPU 11 advances the processing to step S105.

In step S105, the CPU 11 executes the detection II. Details of the detection II are described later.

In step S106, the CPU 11 determines whether or not an abnormality (fault) related to the drive signal Vdrv, the control signal Vset, or the power supply circuit has been detected based on a result of executing the detection II. If an anomaly is detected, the CPU 11 advances the processing to step S113. If an anomaly is not detected in in step S106, the CPU 11 advances the processing to step S107.

In step S107, the CPU 11 starts the print job.

In step S108, the CPU 11 executes the detection III. Details of the detection III are described later.

In step S109, the CPU 11 determines whether an abnormality (a fault) related to the drive signal Vdrv, the control signal Vset, or the power supply circuit is detected based on a result of executing the detection III. If an anomaly is detected, the CPU 11 advances the processing to step S113. If an anomaly is not detected in step S109, the CPU 11 advances the processing to step S110.

In step S110, the CPU 11 determines whether the print job has been completed. For example, if the job is for image formation with respect to five sheets P, the CPU 11 determines whether or not the image formation with respect to all of the five sheets P has been completed. If the print job has been completed, the CPU 11 advances the processing to step S111. If the print job has not completed, the CPU 11 advances the processing to step S108.

In step S111, the CPU 11 executes the detection IV. Details of the detection IV are described later.

In step S112, the CPU 11 determines whether or not an abnormality related to the drive signal Vdrv, the control signal Vset, or the power supply circuit has been detected based on a result of executing the detection IV. If an anomaly is detected, the CPU 11 advances the processing to step S113. If an anomaly is not detected, the CPU 11 advances the processing to step S115.

CPU Functions

FIG. 8 shows functions realized by the CPU 11 according to the control programs. Some or all of these functions may be implemented by hardware circuits such as an ASIC or an FPGA. A first detection functional section 91 executes detection I. An acquiring functional section 101a acquires the detection signal Verr. A determination functional section 102a detects a fault related to the drive signal Vdrv based on the detection signal Verr.

A second detection functional section 92 executes detection II. An acquiring functional section 101b acquires the detection signal Verr. A determination functional section 102b determines a fault (L fixed) related to the drive signal Vdrv based on the detection signal Verr and a timer value of a timer 103a. L fixed is a phenomenon in which the signal level is fixed to the Low level. The determination functional section 102c determines that a fault (L fixed) related to the control signal Vset or a fault (overoutput) of the power supply circuit has occurred, based on the detection signal Verr and a timer value of a timer 103a. The determination functional section 102d determines that a fault (H fixed) related to the control signal Vset or a fault (no output) of the power supply circuit has occurred, based on the detection signal Verr and a timer value of a timer 103a. H fixed is a phenomenon in which the signal level is fixed to the High level. An output control functional section 104a controls a Vdrv generation unit 97 to start and stop output of the drive signal Vdrv. The output control functional section 104a controls the start and stop of output of the control signal Vset by the Vset generation unit 98.

A third detection functional section 93 executes detection III. An acquiring functional section 101c acquires the detection signal Verr. A determination functional section 102e determines that a fault (H fixed) related to the drive signal Vdrv, a fault (L fixed) related to the control signal Vset, or a fault (no output) of the power supply circuit has occurred, based on the detection signal Verr.

A fourth detection functional section 94 executes detection IV. An acquiring functional section 101d acquires the detection signal Verr. Based on the detection signal Verr and the timer value of the timer 103a, the determination functional section 102f determines whether a fault (L fixed) related to the drive signal Vdrv, a fault (H fixed) related to the control signal Vset, or a fault (overoutput) of the power supply circuit has occurred. A determination functional section 102g determines a fault (L fixed) related to the drive signal Vdrv based on the detection signal Verr and a timer value of a timer 103a. A determination functional section 102h determines a fault (H fixed) related to the drive signal Vdrv based on the detection signal Verr and a timer value of a timer 103a. The output control functional section 104b controls the Vdrv generation unit 97 to start and stop output of the drive signal Vdrv. The output control functional section 104b controls the start and stop of output of the control signal Vset by the Vset generation unit 98.

A UI unit 95 includes a display device, and displays a notification indicating occurrence of a fault or an abnormality. A print control unit 96 controls execution of a print job.

Flow Chart of Detection I

Figure 9A:
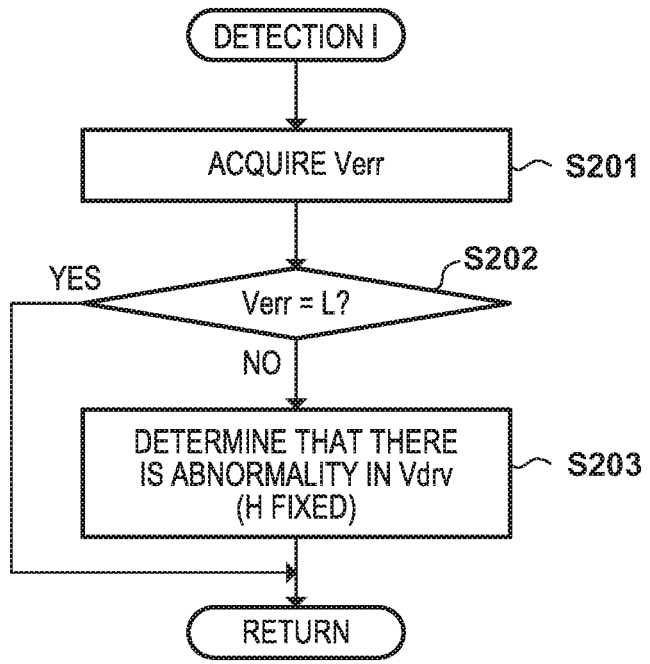
FIGS. 9A and 9B are flow charts showing detection I and detection III.

FIG. 9A is a flow chart illustrating details of the detection I executed by the CPU 11.

In step S201, the CPU 11 (acquiring functional section 101a) acquires the detection signal Verr from the detection circuit 60.

In step S202, the CPU 11 (determination functional section 102a) determines whether the detection signal Verr is low. As shown in FIG. 6, when the detection I is executed, the drive signal Vdrv and the control signal Vset are not being outputted (OFF state). Therefore, the detection signal Verr should be Low. Therefore, when the detection signal Verr is low, the determination functional section 102a determines that the drive signal Vdrv is normal. On the other hand, if the detection signal Verr is High, the determination functional section 102a advances the processing to step S203.

In step S203, the CPU 11 (determination functional section 102a) determines that the drive signal Vdrv is not normal (Vdrv is abnormal (H fixed)).

FIG. 10A shows a case in which the drive signal Vdrv is fixed to High at the timing t1. The drive signal Vdrv is fixed to be always High (=3.3V). Note that the control signal Vset is still not being outputted (Vset=3.3V). The output voltage Vdc is also 0V. Therefore, the feedback voltage Vsns is also 3.3V. Since the peak hold output Vpeak of the drive signal detection circuit 70 shown in FIG. 5 becomes 3.3V, the digital transistors 71 and 72 are turned on, and the detection signal Verr becomes High (=3.0V). Because the detection signal Verr is High, the determination functional section 102a determines that the drive signal Vdrv has an abnormality.

Flow Chart of Detection II

Figure 11:
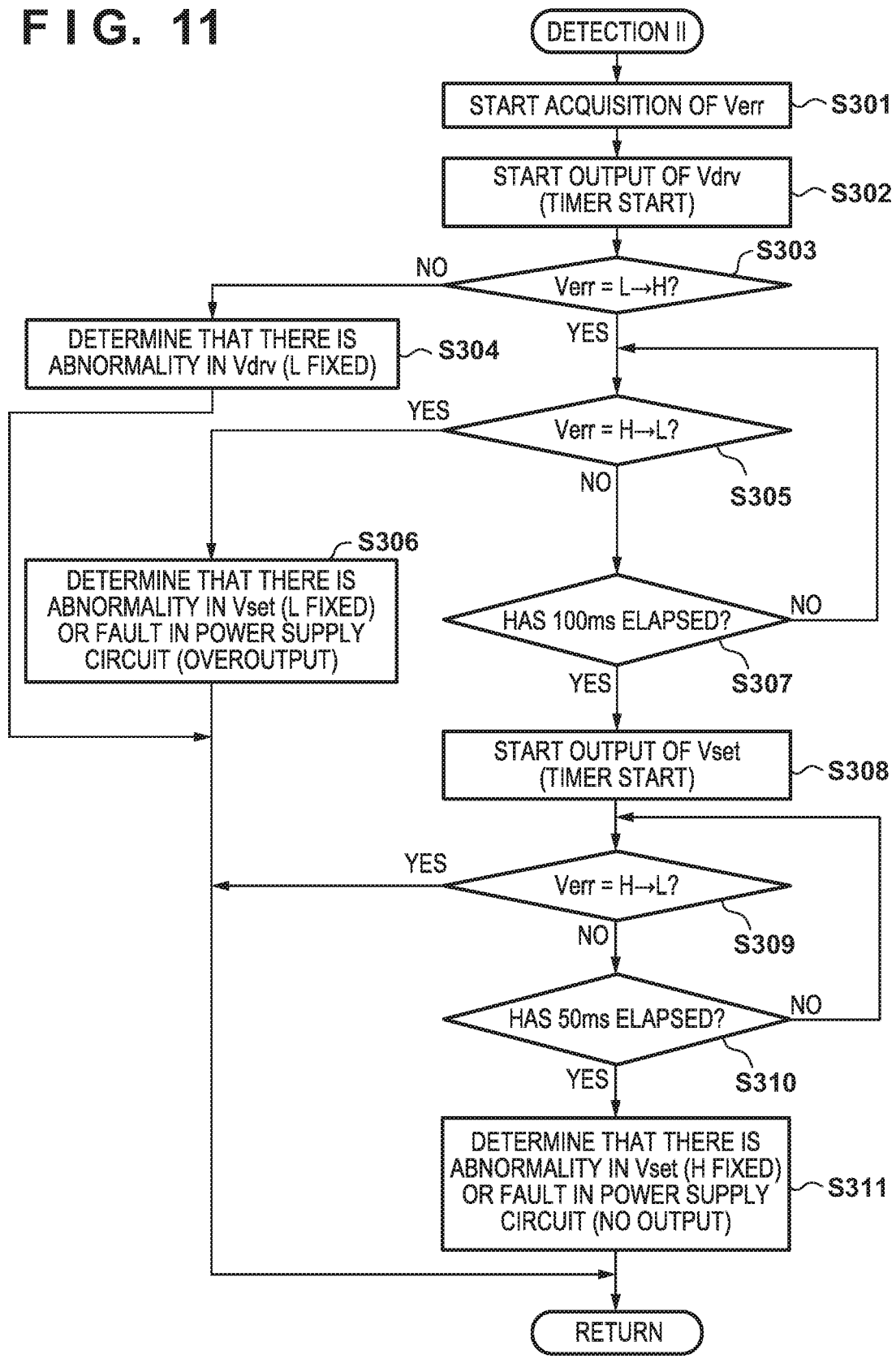
FIG. 11 is a flow chart showing detection II.

FIG. 11 is a flow chart illustrating details of the detection II executed by the CPU 11. As shown in FIG. 6, the detection II is executed in the time period from the timing t2 to the timing t6.

[Drive Signal Error Determination]

In step S301, the CPU 11 (acquiring functional section 101b) starts acquisition of the detection signal Verr. For example, as shown in FIG. 6, the acquiring functional section 101b samples the detection signal Verr every predetermined sampling period (e.g., 1 ms).

In step S302, the CPU 11 (the output control functional section 104a) starts output of the drive signal Vdrv. An output control functional section 104a controls the Vdrv generation unit 97 to start and stop output of the drive signal Vdrv. In addition, the determination functional section 102b causes the timer 103a to start counting. In other words, the timer 103a starts counting time from timing t2 (timing at which output of the drive signal Vdrv is started).

In step S303, the CPU 11 (determination functional section 102b) determines whether or not the detection signal Verr is switched from Low to High within a predetermined period of time (e.g., 100 ms). As shown in FIG. 6, if the drive signal Vdrv is outputted normally, the peak hold output Vpeak becomes 3.3V. Therefore, the detection signal Verr should be switched from Low to High at the timing t3. In the present embodiment, it is assumed that the period of time required from when output of the drive signal Vdrv is started to when the detection signal Verr is switched from Low to High is 1 ms or less. The determination functional section 102b determines that Vdrv, Vset and the power supply circuits are normal when Verr changes from Low to High within a predetermined period of time and Verr is maintained at High when the predetermined period of time has elapsed. Therefore, if it is not detected in step S303 that Verr has switched from Low to High within the predetermined period of time, the CPU 11 advances the processing to step S304. In step S304, the CPU 11 (determination functional section 102b) determines that the drive signal Vdrv is abnormal (Vdrv is fixed to Low). As shown in FIG. 10B, the reason why Verr does not change from Low to High within a predetermined period of time is that the drive signal Vdrv is fixed to Low. This is because the control signal Vset is not being outputted in the time period from the timing t2 to the timing t4 (Vset=3.3V). In contrast, if it is detected in step S303 that Verr has switched from Low to High within the predetermined period of time, the CPU 11 advances the processing to step S305.

[Control Signal (L Fixed) and Power Supply Circuit Error Determination]

In step S305, the CPU 11 (determination functional section 102c) determines whether or not Verr switched from High to Low. If Verr has not switched from High to Low, the CPU 11 advances the processing to step S307. In step S307, the CPU 11 (determination functional section 102c) determines whether or not a predetermined period of time (e.g., 100 ms) has elapsed from the timing at which output of the drive signal Vdrv is started. The determination functional section 102c determines whether or not the count value of the timer 103a exceeds a predetermined period of time (e.g., 100 ms). When the count value exceeds the predetermined period of time, the CPU 11 advances the processing to step S308. In contrast, if the count value has not exceeded the predetermined period of time, the CPU 11 advances the processing to step S305.

In this manner, the determination functional section 102c determines whether or not Verr has switched from High to Low within a predetermined period of time. If Verr has not switched from High to Low within the predetermined period of time, the CPU 11 advances the processing to step S306. In step S306, the CPU 11 (determination functional section 102c) determines that the control signal Vset is abnormal (L fixed) or the power supply circuit has a fault (overoutput).

Figure 12A:
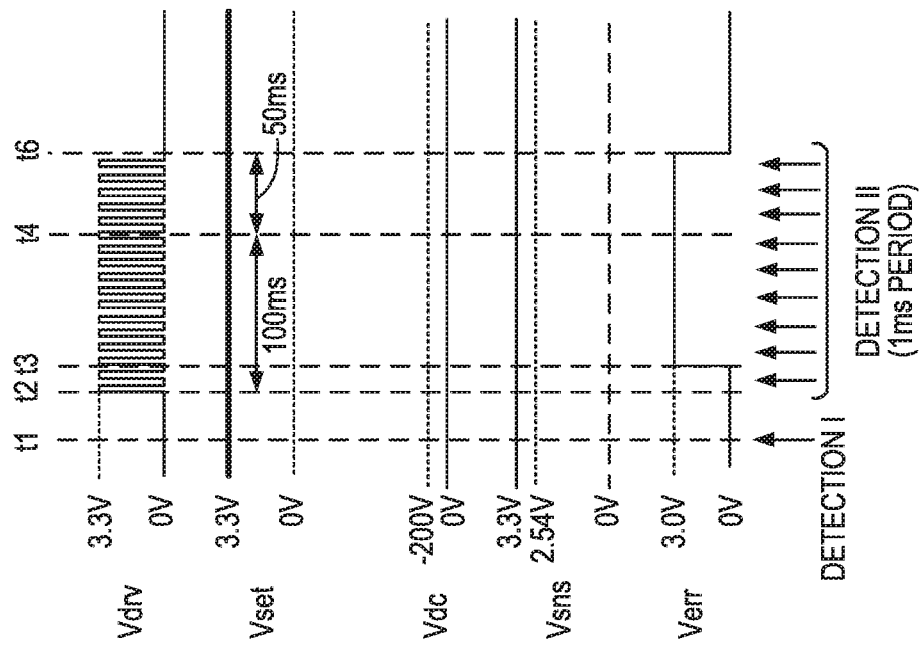

As shown in FIG. 12A, although the detection signal Verr changes from Low to High within 100 ms from the timing t2, there are cases where it is not possible to maintain the detection signal Verr at High until the timing t4 at which 100 ms has elapsed from the timing t2. One of the reasons for this is that the control signal Vset is fixed to Low. When the control signal Vset is fixed to Low, the output voltage Vdc increases toward the maximum output. Further, the feedback voltage Vsns decreases as the output voltage Vdc increases. Eventually, at timing t10, the feedback voltage Vsns falls below the reference voltage Vref. When the feedback voltage Vsns falls below the reference voltage Vref, the detection signal Verr forcibly becomes Low. It should be noted that even when the output voltage Vdc has overoutput due to a fault of the power supply circuit, the detection signal Verr becomes low.

[Control Signal (H Fixed) and Power Supply Circuit Error Determination]

As shown in FIG. 6, in a case where the detection signal Verr switches from Low to High within the predetermined period of time and Verr is maintained at High when the predetermined period of time has elapsed, the CPU 11 advances the processing to step S308.

In step S308, the CPU 11 (the output control functional section 104a) starts output of the control signal Vset. An output control functional section 104a sets the duty ratio of the control signal Vset, which is a PWM signal, in the Vset generation unit 98, and causes Vset generation unit 98 to start outputting the control signal Vset. Note that the determination functional section 102d causes the timer 103a to start (restart).

In step S309, the CPU 11 (determination functional section 102d) determines whether or not the detection signal Verr switched from High to low. If the detection signal Verr has not switched from High to Low, the CPU 11 advances the processing to step S106. If the detection signal Verr has not switched from High to Low, the CPU 11 advances the processing to step S310.

In step S310, the CPU 11 (determination functional section 102d) determines whether or not a predetermined period of time (e.g., 50 ms) has elapsed from the timing t4 at which output of the control signal Vset is started. The determination functional section 102d determines whether or not the count value of the timer 103a exceeds a predetermined period of time (e.g., 50 ms). If the count value does not exceed the predetermined period of time, the CPU 11 advances the processing to step S309. In contrast, when the count value exceeds the predetermined period of time, the CPU 11 advances the processing to step S311. In other words, if the detection signal Verr has not switched from High to Low within the predetermined period of time, the CPU 11 advances the processing to step S311. If the detection signal Verr has not switched from High to Low within the predetermined period of time, the CPU 11 advances the processing to step S106.

As shown in FIG. 6, when the output of the control signal Vset is started, output of the output voltage Vdc is also started, so that the feedback voltage Vsns starts to fall from 3.3V. In the present embodiment, a normal output voltage Vdc is −580V, and a corresponding feedback voltage Vsns is assumed to be 1.32V. Since the feedback voltage Vsns falls below the reference voltage Vref at the timing t5, the detection signal Verr becomes Low. Note that a period of time from the timing t4 to the timing t5 is, for example, 5 ms. The output voltage Vdc reaches −580V within 50 ms. By this, the feedback voltage Vsns is also 1.32V. At timing t6, the output voltage Vdc is normally being outputted, and the CPU 11 (print control unit 96) ends the pre-rotation operation and starts the print job. That is, when Verr changes from Low to High within a predetermined period of time, the determination functional section 102d determines that the drive signal Vdrv, the control signal Vset, and the power supply circuit are normal.

Figure 12B:
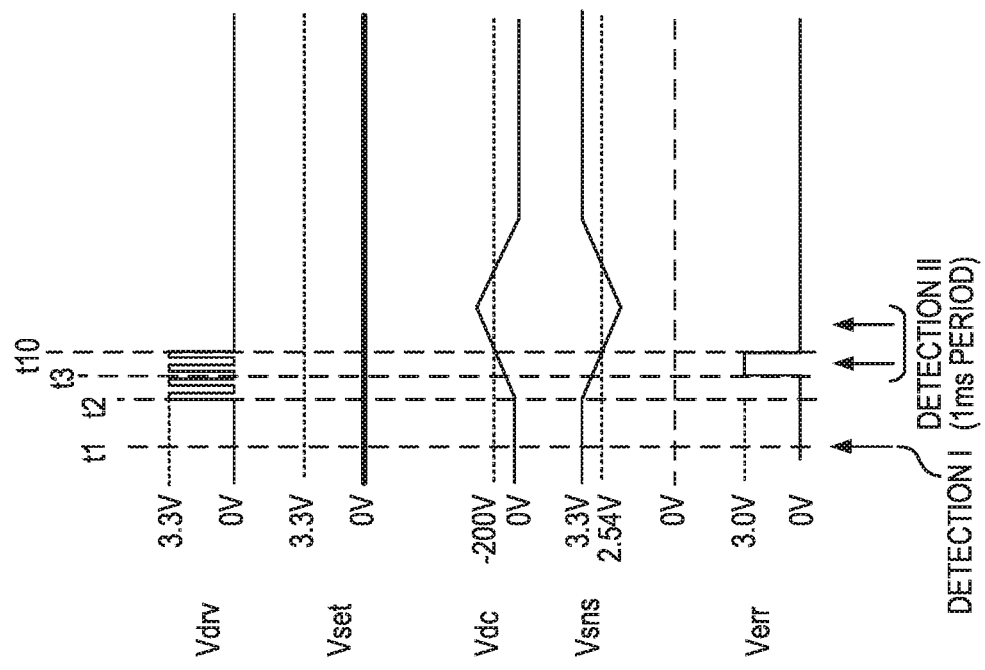

FIG. 12B shows that the control signal Vset is not being outputted in the detection II (H fixed). In this case, the control signal Vset is not being outputted at timing t4, and the control signal Vset is fixed to High. Therefore, the determination functional section 102d cannot detect Verr changing from High to Low within a predetermined period of time. As described above, as shown in the circuit diagram of FIG. 5, when the control signal Vset is not outputted, the output terminal of the comparator 81 becomes Hi-Z (release), so that the detection signal Verr is not affected. Since the drive signal Vdrv is normally being outputted, the detection signal Verr becomes High.

Flow Chart of Detection III

Figure 9B:
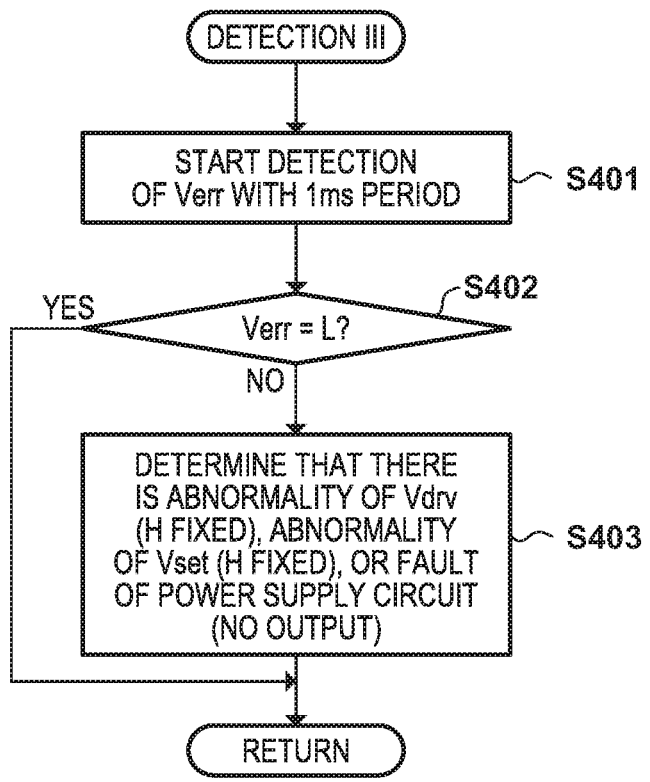

FIG. 9B is a flow chart illustrating details of the detection III executed by the CPU 11.

In step S401, the CPU 11 (acquiring functional section 101c) starts acquisition of the detection signal Verr from the detection circuit 60. The acquiring functional section 101c samples the detection signal Verr every predetermined sampling period (e.g., 1 ms).

In step S402, the CPU 11 (determination functional section 102e) determines whether the detection signal Verr is low. As shown in FIG. 6, when the detection III is executed, the drive signal Vdrv and the control signal Vset are being outputted, and it should be the case that the output voltage Vdc is being outputted. Therefore, the detection signal Verr should be Low. Therefore, when the detection signal Verr is Low, the determination functional section 102e determines that the drive signal Vdrv is normal. On the other hand, if the detection signal Verr is High, the determination functional section 102e advances the processing to step S403.

In step S403, the CPU 11 (determination functional section 102a) determines that there is an abnormality (H fixed) of the drive signal Vdrv, an abnormality (H fixed) of the control signal Vset, or a fault (no output) of the power supply circuit.

FIG. 13A shows a case in which the drive signal Vdrv is fixed to High in the detection III. At timing t11, the drive signal Vdrv is fixed to High. As a result, the output voltage Vdc starts to change from −580V toward 0V. Similarly, the feedback voltage Vsns starts to change from 1.32V toward 3.3V. Since the feedback voltage Vsns exceeds the reference voltage Vref at the timing t12, the detection signal Verr changes from Low to High. At timing t13, the determination functional section 102e detects the occurrence of an error and stops the output of the drive signal Vdrv and the control signal Vset.

FIG. 13B shows a case in which the control signal Vset is fixed to High in the detection III. At timing t14, the control signal Vset is fixed to High. As a result, the output voltage Vdc starts to change from −580V toward 0V. Similarly, the feedback voltage Vsns starts to change from 1.32V toward 3.3V. Since the feedback voltage Vsns exceeds the reference voltage Vref at the timing t12, the detection signal Verr changes from Low to High. At timing t13, the determination functional section 102e detects the occurrence of an error and stops the output of the drive signal Vdrv and the control signal Vset.

In this manner, an error during execution of a print job is detected based on whether or not the detection signal Verr has changed to High. Here, the drive signal Vdrv being H fixed and the control signal Vset being L fixed have been described, but the output voltage Vdc may become 0V due to a fault of the power supply circuit. In this case, because the feedback voltage Vsns exceeds the reference voltage Vref, the detection signal Verr changes from Low to High. Therefore, the determination functional section 102e can also detect a fault (no output) of the power supply circuit.

Flow Chart of Detection IV

Figure 14:
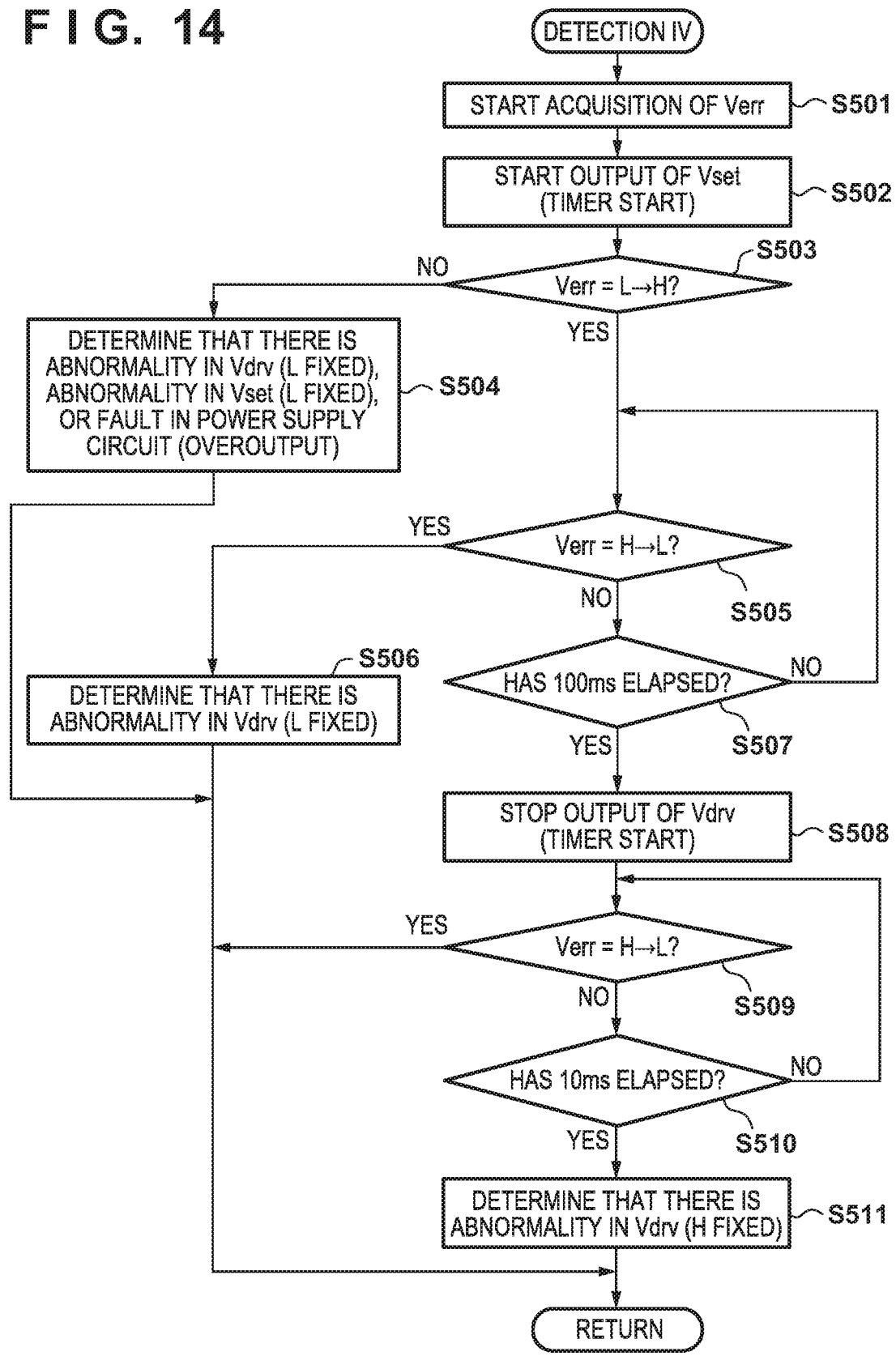
FIG. 14 is a flow chart illustrating detection IV.

FIG. 14 is a flow chart illustrating details of the detection IV executed by the CPU 11. Detection IV is executed in a post-rotation operation. As shown in FIG. 6, the post-rotation operation is started at timing t7. The control signal Vset is stopped before the drive signal Vdrv. By this, the output voltage Vdc decreases, and the feedback voltage Vsns increases. At timing t8, the detection signal Verr changes from Low to High. Because the drive signal Vdrv stops at the timing t9, the detection signal Verr becomes Low. Therefore, if the transition of each signal is not such a transition, some kind of abnormality has occurred.

[Error Determination of Drive Signals and Control Signals, Etc.]

In step S501, the CPU 11 (acquiring functional section 101d) starts acquisition of the detection signal Verr. For example, as shown in FIG. 6, the acquiring functional section 101d samples the detection signal Verr every predetermined sampling period (e.g., 1 ms).

In step S502, the CPU 11 (the output control functional section 104b) stops output of the control signal Vset. An output control functional section 104b controls a Vset generation unit 98 to cause output of the control signal Vset to stop. In addition, the determination functional section 102f causes the timer 103b to start counting.

In step S503, the CPU 11 (determination functional section 1020 determines whether or not the detection signal Verr is switched from Low to High within a predetermined period of time (e.g., 100 ms). If Verr has not switched from High to Low within the predetermined period of time, the CPU 11 advances the processing to step S504. In step S504, the CPU 11 (determination functional section 1020 determines that Vdrv is abnormal (L fixed), Vset is abnormal (L fixed), or the power supply circuit has a fault (overoutput). In contrast, if Verr has not switched from High to Low in step S503, the CPU 11 advances the processing to step S505.

FIG. 15A shows a case in which the control signal Vset is fixed to Low in the detection IV. At timing t7, output of the control signal Vset is stopped. However, at timing t15, the control signal Vset is fixed to 0V (Low). As a result, the output voltage Vdc enters an overoutput state, and the feedback voltage Vsns does not exceed the reference voltage Vref (=2.54V). Therefore, the detection signal Verr continuously remains Low. The determination functional section 102f cannot detect High of the detection signal Verr even once until the timing t9 at which 100 ms has elapsed after output of the control signal Vset is stopped at the timing t7. Therefore, the determination functional section 102f determines that an abnormality (L fixed) of the control signal Vset has occurred.

Figure 16A:
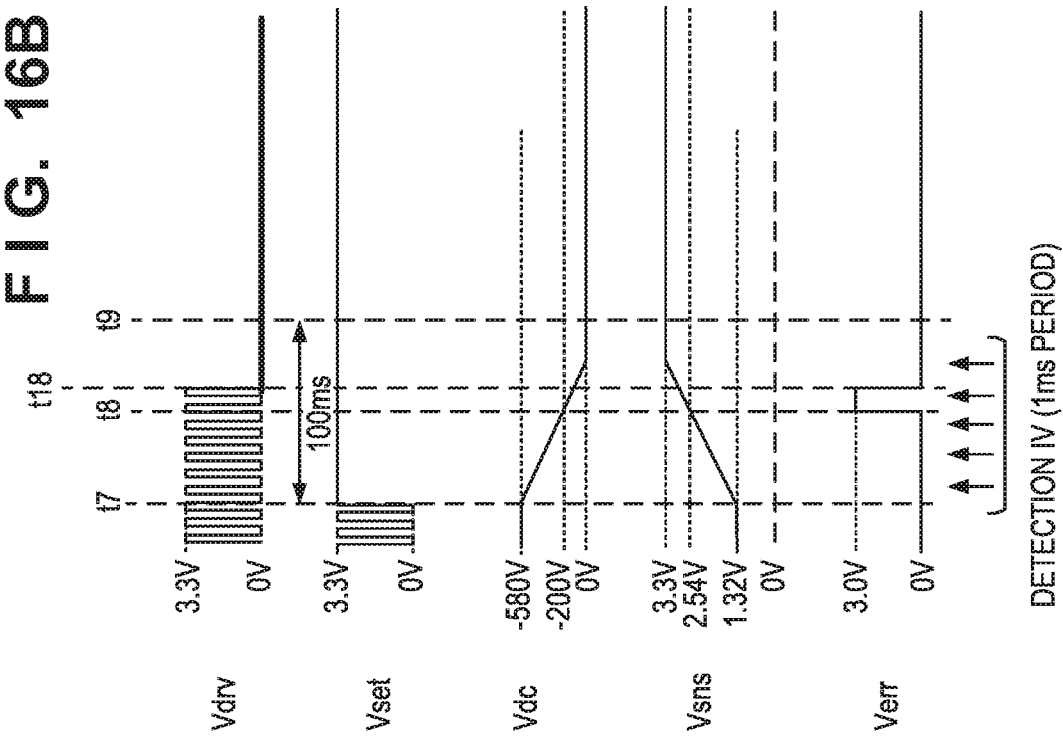
FIGS. 16A and 16B are diagrams for describing an anomaly detected by detection IV.
Figure 16B:
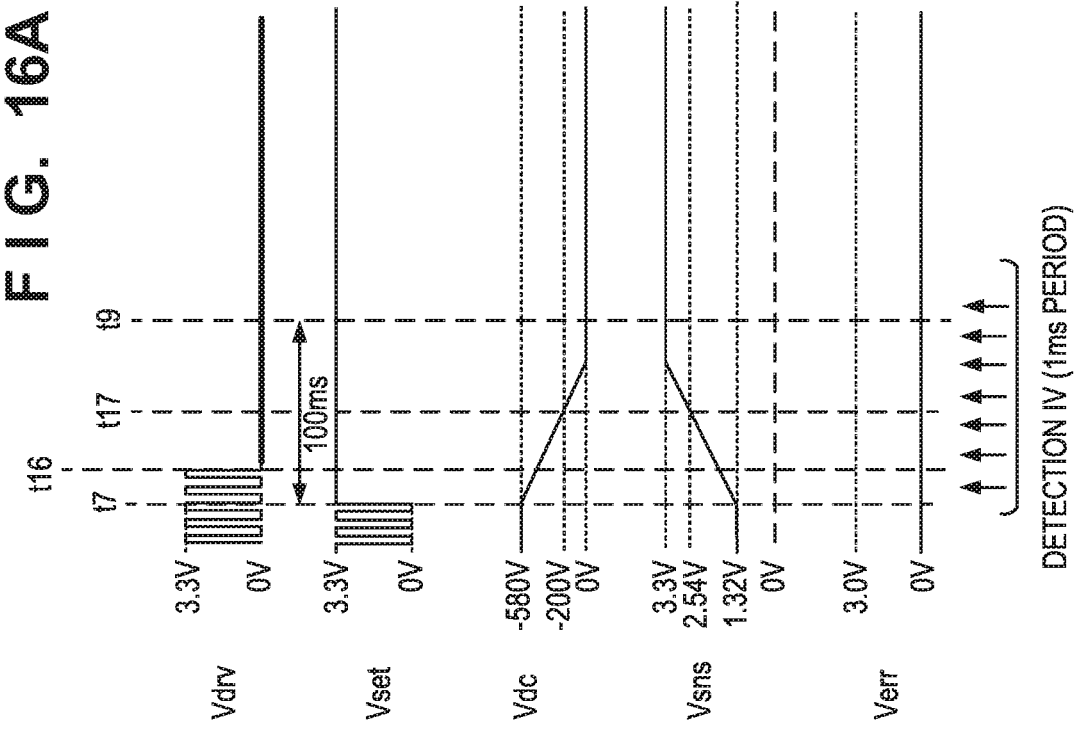

FIG. 16A and FIG. 16B show a case in which the drive signal Vdrv is fixed to Low in the detection IV. As shown in FIG. 6, the drive signal Vdrv is usually outputted until timing t9. The behavior of the detection signal Verr depends on whether the timing at which the drive signal Vdrv is fixed to Low is prior to the timing at which the feedback voltage Vsns exceeds the reference voltage Vref. In particular, in FIG. 16A, Vdrv is fixed to Low at timing t16 which is prior to timing t17 at which Vsns exceeds Vref. In FIG. 16B, Vdrv is fixed to Low at timing t18 which is after timing t8 at which Vsns exceeds Vref.

As shown in FIG. 16A, when the drive signal Vdrv is fixed to Low at timing t16, Vpeak becomes 0V. Therefore, the detection signal becomes Low. At timing t17 when the feedback voltage Vsns exceeds the reference voltage Vref, the detection signal Verr is not switched to High. In other words, until 100 ms has elapsed from the stop of the output of the control signal Vset (timing t9), the CPU 11 is not able to detect High even once. Therefore, the CPU 11 determines that an anomaly has occurred. Even if the power supply circuit has a fault and overoutput occurs, the CPU 11 is not able to detect High even once. Accordingly, the determination functional section 102f determines that Vdrv is abnormal (L fixed), Vset is abnormal (L fixed), or the power supply circuit has a fault (overoutput).

[Drive Signal Error (L Fixed) Determination]

In step S505, the CPU 11 (determination functional section 102g) determines whether or not the detection signal Verr switched from High to Low. If the detection signal Verr has switched from High to Low before the predetermined period of time elapses, the CPU 11 advances the processing to step S506. In step S506, the CPU 11 (determination functional section 102g) determines that there is an abnormality in Vdrv (L fixed). When it is determined in step S505 that the detection signal Verr has not switched from High to Low, the CPU 11 advances the processing to step S507. In step S507, the CPU 11 (determination functional section 102g) determines whether or not a predetermined period of time (e.g., 100 ms) has elapsed from when Vset is stopped. If the predetermined period of time has not elapsed, the CPU 11 advances the processing to step S505. If the predetermined period of time has elapsed, the CPU 11 advances the processing to step S508.

As shown in FIG. 16B, although the detection signal Verr becomes High at timing t8, the drive signal Vdrv is fixed to Low at timing t18. Further, the detection signal Verr changes to Low prior to the passage of 100 ms. Therefore, the CPU 11 determines that an abnormality (L fixed) of the drive signal Vdrv has occurred.

[Drive Signal Error (H Fixed) Determination]

As shown in FIG. 6, when the drive signal Vdrv is stopped, the detection signal Verr should be switched from High to Low. However, since there is a transient response, it is determined whether or not the detection signal Verr is switched from High to Low within a predetermined period of time.

In step S508, the CPU 11 (the output control functional section 104b) stops output of the drive signal Vdrv. The output control functional section 104b controls the Vdrv generation unit 97 to cause output of the drive signal Vdrv to stop. The determination functional section 102d causes the timer 103b to start (restart).

In step S509, the CPU 11 (determination functional section 102h) determines whether or not the detection signal Verr switched from High to low. When the detection signal Verr switches from High to Low, the CPU 11 advances the processing to step S112. If the detection signal Verr has not switched from High to Low, the CPU 11 advances the processing to step S510.

In step S510, the CPU 11 (determination functional section 102h) determines whether or not a predetermined period of time (e.g., 10 ms) has elapsed from the timing t9 at which output of the drive signal Vdrv is stopped. The predetermined period of time is decided based on a period of time required for the output voltage Vdc to sufficiently drop from the target voltage to 0V (for example, 5 ms). The determination functional section 102h determines whether or not the count value of the timer 103b exceeds a predetermined period of time (e.g., 10 ms). If the count value does not exceed the predetermined period of time, the CPU 11 advances the process to step S509. In contrast, when the count value exceeds the predetermined period of time, the CPU 11 advances the processing to step S511. In other words, if the detection signal Verr has not switched from High to Low within the predetermined period of time, the CPU 11 advances the processing to step S511. In step S511, the CPU 11 (determination functional section 102h) determines that there is an abnormality in the drive signal Vdrv (H fixed). In contrast, if the detection signal Verr has switched from High to Low within the predetermined period of time, the CPU 11 advances the processing to step S112.

FIG. 15B shows a case in which the drive signal Vdrv is fixed to High in the detection IV. At timing t19, which is a timing after the control signal Vset is stopped, the drive signal Vdrv is fixed to High. However, since the control signal Vset already stopped at timing t7, the output voltage Vdc changes to 0V. Accordingly, at timing t8, the detection signal Verr changes from Low to High. However, since the peak hold output Vpeak is held at 3.3V, the detection signal Verr maintains High. The timing t9 is a timing at which 100 ms has elapsed from the stoppage of the output of the control signal Vset. At timing t9, the CPU 11 makes an instruction for the drive signal Vdrv to stop, but the drive signal Vdrv is fixed to High. Therefore, the detection signal Verr is maintained at High. The timing t20 is a timing at which 10 ms has elapsed from the timing t9. At timing t20, the CPU 11 determines that an error has occurred. In other words, since the detection signal Verr does not become Low even though 10 ms has elapsed since the drive signal Vdrv was stopped, it is determined that an abnormality (Vdrv is H fixed) has occurred.

<Technical Concept Derived from Embodiments>

[Viewpoint 1] (Detection II)

The power supply apparatus 9 is an example of a power supply apparatus for outputting a voltage to be supplied to a load. The CPU 11, the Vdrv generation unit 97 and the Vset generation unit 98 function as generation units (generation circuits) for generating drive signals and control signals. That is, the CPU 11, the Vdrv generation unit 97 and the Vset generation unit 98 function as generation units (generation circuits) for generating a control signal for setting a target voltage to be output and a drive signal for driving the elements of the power supply apparatus so as to output the target voltage. The charging circuit 21, the development circuit 22, and the transfer circuit 23 are examples of power supply circuits to which a drive signal and a control signal are input. When a drive signal and a control signal are inputted to the power supply circuit, the power supply circuit starts generating an output voltage based on a target voltage specified by the control signal. The detection circuit 60 generates a drive signal, a control signal, or a detection signal used for determining a fault related to the power supply circuit based on the drive signal and the output voltage output from the power supply circuit. The CPU 11 and the error detection functional section 61 function as a determination circuit that determines or detects the presence or absence of a fault related to the drive signal based on the detection signal outputted from the detection circuit. As described with respect to detection II, when the drive signal is outputted and the output of the control signal is stopped by the generation unit starting the output of the drive signal prior to that of the control signal, the determination circuit determines a fault related to the drive signal. The generation unit starts outputting the control signal when the determination circuit does not detect a fault related to the drive signal. When a fault related to the drive signal is detected by the determination circuit, output of the drive signal is stopped. Accordingly, a power supply apparatus 9 capable of detecting a fault related to a drive signal (an abnormality of the drive signal) is provided. Note that the CPU 11 is an example of at least one processor. The processor may be realized by one or combinations of a CPU, an ASIC (application specific integrated circuit) and an FPGA (field-programmable gate array).

[Viewpoint 2] (Detection II)

As shown in FIG. 6 and the like, the CPU 11 starts the output of the drive signal Vdrv when the first time period (e.g., t2 to t4) starts, but does not start the output of the control signal Vset. The CPU 11 may determine that a fault related to the drive signal has occurred when the level of the detection signal Verr does not change from a first level (e.g., Low) to a second level (e.g., High) even once in a first time period. As a result, a fault associated with the drive signal Vdrv can be detected with a relatively simple circuit configuration.

[Viewpoint 3] (Detection II)

There are cases where the level of the detection signal Verr changes from the first level to the second level during the first time period (e.g., t2 to t4), and the level of the detection signal returns from the second level to the first level at the end of the first time period. In this instance, the CPU 11 may determine that a fault related to the control signal Vset or the power supply circuit (e.g., the DC circuit 25a) has occurred. As a result, a fault of the control signal Vset or the power supply circuit can be detected.

Since the circuit configuration of the DC circuit 25a and the circuit configuration of the DC circuit 25b are substantially the same, the detection circuit 60 can be employed in the DC circuit 25b. The circuit configurations of the AC circuits 24a and 24b are also similar to the circuit configuration of the DC circuit 25a. In this instance, the detection circuit 60 similarly generates the detection signal Verr based on the drive signal Vdrv and the feedback voltage Vsns which is for feeding back the output voltage Vac. Therefore, the present invention can be similarly applied to a power supply circuit which operates in accordance with a control signal for setting a target voltage and a drive signal such as a clock signal.

[Viewpoint 4] (Detection II)

As shown in FIG. 6 and the like, the CPU 11 may start output of a control signal at the beginning of a second time period (e.g., t4 to t6) following the first time period. The CPU 11 may determine that a fault related to the control signal or the power supply circuit has occurred if the level of the detection signal does not return from the second level to the first level by the end of the second time period. The CPU 11 may determine that a fault related to the control signal and the power supply circuit has not occurred if the level of the detection signal returns from the second level to the first level by the end of the second time period. As a result, a fault related to the control signal and the power supply circuit is detected.

[Viewpoint 5] (Detection III)

As shown in FIG. 6 and the like, the CPU 11 outputs both the drive signal and the control signal in the third time period (e.g., t6 to t7). The CPU 11 may determine that a fault related to the drive signal, the control signal, or the power supply circuit has not occurred if the level of the detection signal is maintained at the first level in the third time period. The CPU 11 may determine that a fault related to the drive signal, the control signal, or the power supply circuit has occurred if the level of the detection signal becomes the second level in the third time period. As a result, the third time period in which both the drive signal and the control signal are output is a time period in which the load supplied with power from the power supply apparatus 9 is fully operated (for example, a time period in which a print job is executed). Therefore, since a large current tends to flow in the power supply circuit, early detection of a fault may be useful so as to not introduce a chain of faults.

[Viewpoint 6] (Detection IV)

Configuration may be taken such that, at the beginning of the fourth time period (e.g., t7 to t9), the CPU 11 stops output of the control signal while continuing output of the drive signal. As shown in FIG. 6, usually, in the fourth time period, the level of the detection signal changes from the first level to the second level. However, there are cases where the level of the detection signal does not change from the first level to the second level even once in the fourth time period. In this instance, the CPU 11 may determine that a fault related to the drive signal, the control signal, or the power supply circuit has occurred. Especially, by stopping the control signal prior to the drive signal, it becomes possible to detect a fault related to the drive signal, the control signal, or the power supply circuit even in a time period where the output voltage Vdc falls.

[Viewpoint 7] (Detection IV)

As shown in FIG. 16B, in the fourth time period, there are cases where the level of the detection signal changes from the first level to the second level, and the level of the detection signal returns from the second level to the first level. In this instance, the CPU 11 may determine that a fault related to the drive signal has occurred. As described above, even in the time period where the output voltage Vdc falls, it is possible to detect a fault related to the drive signal.

[Viewpoint 8] (Detection IV)

As shown in FIG. 6, the CPU 11 stops outputting the drive signal when the level of the detection signal is maintained at the second level at the end of the fourth time period. As shown in FIG. 6, it is assumed that the level of the detection signal returns from the second level to the first level in a fifth time period following the fourth time period (e.g., a time period of 10 ms from t9). In this instance, the CPU 11 may determine that a fault related to the drive signal, the control signal, or the power supply circuit has not occurred.

[Viewpoint 9] (Detection IV)

As shown in FIG. 15B, there are cases where the level of the detection signal is maintained at the second level (e.g., High) at the end of the fifth time period. In this instance, the CPU 11 may determine that a fault related to the drive signal has occurred. This makes it possible to detect a fault after the output voltage Vdc stops.

[Viewpoint 10] (Detection I)

As shown in FIG. 6, the CPU 11 may execute the detection I at a timing when the generation unit has stopped both the drive signal and the control signal (e.g., t1). The CPU 11 may determine that a fault related to the drive signal has occurred when the detection signal indicates that the level of the drive signal is fixed to a predetermined level. The CPU 11 may determine that a fault related the drive signal has not occurred when the detection signal indicates that the level of the drive signal is not fixed to a predetermined level. Thus, before the output voltage Vdc rises, it is possible to detect a fault related to the drive signal.

[Viewpoint 11]

As shown in FIG. 3 and the like, the power supply circuit may include a transformer 46, a switching element (FET 45) for switching a primary side voltage applied to the primary side of the transformer based on the drive signal, and a setting circuit for setting the magnitude of the primary side voltage based on the control signal. The setting circuit may be configured by the LPF 41, the error amplifier 42, the feedback circuit 48, the transistor 43, or the like.

[Viewpoint 12]

The detection circuit 60 may include a first detection circuit for detecting the drive signal, a second detection circuit for detecting the output voltage, and a generation circuit for generating a detection signal based on a detection result of the first detection circuit and a detection result of the second detection circuit. As shown in FIG. 5, the drive signal detection circuit 70 is an example of a first detection circuit. The output detection circuit 80 is an example of a second detection circuit. The generation circuit is configured by a 3.3V power supply, the resistors R1 and R2, and the like. In this manner, the detection circuit 60 may be configured with a relatively simple circuit configuration.

[Viewpoint 13]

The generation circuit shown in FIG. 5 is configured to output a detection signal of the first level without depending on the detection result of the first detection circuit when the output voltage is detected by the second detection circuit. This may be realized by the output detection circuit 80 forcibly setting the detection signal to Low when the output detection circuit 80 detects the output voltage. The generation circuit may be configured to output a detection signal of a level according to the detection result of the first detection circuit when the output voltage is not detected by the second detection circuit. As shown in FIG. 5, this may be realized by setting the output terminal of the output detection circuit 80 to an open state (high impedance state) when the output voltage is not detected. In this way, a relatively simple circuit configuration enables the generation of a drive signal, a control signal and a detection signal Verr which is useful for the detection of a fault in the power supply circuit.

[Viewpoint 14] (Detection of Abnormality by Outputting a Control Signal after a Drive Signal)

The CPU 11, the Vdrv generation unit 97 and the Vset generation unit 98 are an example of a generation unit for generating drive signals and control signals. The charging circuit 21, the development circuit 22, and the transfer circuit 23 are examples of a power supply circuit that, when inputted with a drive signal and a control signal, starts generating an output voltage based on a target voltage specified by a control signal. The detection circuit 60 is an example of a detection circuit for generating a detection signal used for determining a fault related to a drive signal, a control signal, or the power supply circuit based on the drive signal and the output voltage output from the power supply circuit. The CPU 11 is an example of a determination unit that determines the presence or absence of a fault related to the drive signal, the control signal, or the power supply circuit based on the detection signal outputted from the detection circuit. Detection I is an example of a first sequence for determining the occurrence of a fault related to the drive signal at a timing at which the generation unit has stopped both the drive signal and the control signal. Detection II is an example of a second sequence for determining the occurrence of a fault related to the drive signal, the control signal and the power supply circuit in a first time period in which the generation unit starts outputting the drive signal and does not start outputting the control signal. Detection II is an example of a second sequence for determining the occurrence of a fault related to the control signal and the power supply circuit in a second time period in which the generation unit is outputting the drive signal and has started output of the control signal. As described above, by changing the output state of the drive signal and the output state of the control signal, it becomes possible to detect the occurrence of a fault related to the drive signal, the control signal, and the power supply circuit.

[Viewpoint 15]

Detection III is an example of a third sequence for determining the occurrence of a fault related to the drive signal, the control signal, and the power supply circuit in a third time period in which the generation unit is continuously outputting the drive signal and is continuously outputting the control signal. By introducing the detection III, a fault can be detected early even during a period in which the power supply apparatus 9 is fully operating.

[Viewpoint 16]

Detection IV is an example of a fourth sequence for determining the occurrence of a fault related to the drive signal, the control signal, and the power supply circuit in a fourth time period in which the generation unit is continuously outputting the drive signal and has stopped output of the control signal. As described above, by changing the output state of the drive signal and the output state of the control signal, it is possible to detect a fault even in a time period in which the output voltage falls.

[Viewpoint 17]

Detection IV which is a fourth sequence may include the generation unit stopping the output of the drive signal at the start of a fifth time period following the fourth time period, and the determination unit determining the occurrence of a fault related to the control signal and the power supply circuit in the fifth time period. This makes it possible to detect a fault of the power supply circuit even after the power supply circuit stops.

[Viewpoint 18]

The CPU 11 may determine that a fault related to the drive signal has occurred when the level of the detection signal is the second level in the first sequence. This makes it possible to detect a fault of the drive signal before the output of the output voltage is started. If a fault related to the drive signal is detected, the CPU 11 does not permit output of the drive signal and the control signal. Therefore, it is possible to prevent a fault of the drive signal from spreading to become a fault of the power supply circuit.

[Viewpoint 19]

The CPU 11 may determine that a fault related to the drive signal has occurred if the level of the detection signal has not changed from the first level to the second level by the end of the first time period in the second sequence. The CPU 11 may determine that a fault related to the control signal or the power supply circuit has occurred if the level of the detection signal returns from the second level to the first level by the end of the first time period. The CPU 11 may determine that a fault related to the control signal or the power supply circuit has occurred if the level of the detection signal returns from the first level to the second level by the end of the second time period. As described above, it is possible to detect various faults at an early stage even in a time period where the output voltage rises.

[Viewpoint 20]

The CPU 11 may determine that a fault related to the drive signal, the control signal, or the power supply circuit has occurred if the level of the detection signal has returned from the first level to the second level by the end of the third time period in the third sequence. By introducing the detection III, a fault can be detected early even during a period in which the power supply apparatus 9 is fully operating.

[Viewpoint 21]

The CPU 11 may determine that a fault related to the drive signal, the control signal, or the power supply circuit has occurred if the level of the detection signal has not changed from the first level to the second level by the end of the fourth time period in the fourth sequence. The CPU 11 may determine that a fault related to the drive signal has occurred if the level of the detection signal returns from the second level to the first level by the end of the fourth time period. The CPU 11 may determine that a fault related to the drive signal has occurred if the level of the detection signal returns from the first level to the second level in the fifth time period. This makes it possible to detect various faults in a time period where the output voltage falls.

[Viewpoint 22]

As shown in FIG. 1, the power supply apparatus 9 may be configured to supply power to an electronic apparatus (for example, the image forming apparatus 1). The first sequence may be executed when the image forming apparatus 1 starts a preparation operation (e.g., a pre-rotation operation) for forming an image on a sheet. The second sequence may be executed during the execution of the image forming apparatus 1 preparation operation. The electronic apparatus which is the image forming apparatus 1 or the like may be supplied with a high voltage from the power supply apparatus 9. Therefore, there is a possibility that a large current flows in the primary side of the power supply apparatus 9. Therefore, by employing the present invention, it is possible to detect a fault of the power supply apparatus 9 at an early stage. The photosensitive drum 2 and the like function as an image forming unit that forms an image on a sheet by using the output of the power supply apparatus.

[Other Viewpoints]

The power supply circuit and the detection circuit may be mounted on a first substrate (for example, the power supply substrate 20). The determination circuit may be mounted on a second substrate (e.g., the control substrate 10). As a result, even if the first substrate has a fault, there ceases to be a need to replace the second substrate.

Incidentally, the error detection functional section 61 detects a fault or abnormality related to the DC circuit 25a, but may detect a fault or abnormality of the DC circuit 25b, the AC circuits 24a, 24b, or the like. In this case, the error detection functional section 61 may detect a fault or an abnormality of the DC circuits 25a and 25b and the AC circuits 24a and 24b in parallel or sequentially. One error detection functional section 61 may be provided for each of the DC circuits 25a and 25b and the AC circuits 24a and 24b.

In the present embodiment, the image forming apparatus 1 which forms a monochrome image is exemplified, but the present invention is also applicable to an image forming apparatus 1 which forms a color image. In this case, the present invention is applied to a power supply apparatus 9 for supplying power to four image forming units in charge of yellow, magenta, cyan, and black.

In the present embodiment, the detection I to IV are executed when the print job is inputted, but the detection I to IV may be executed at other timings. The CPU 11 may cause the output voltage to be output to the power supply circuit in order to adjust the relationship between the output voltage and the control voltage. In this case, the CPU 11 may then execute detection I to IV. In the present embodiment, the presence or absence of the output voltage is detected based on the feedback voltage Vsns, but other parameters may be employed. For example, the CPU 11 may determine the presence or absence of the output voltage based on the current flowing through the photosensitive drum 2. In this case, a current detection circuit is employed, and the detection result of the current detection circuit is inputted to the detection circuit 60.

In the present embodiment, various errors are detected based on High/Low of the detection signal Verr. Therefore, the CPU 11 may have a digital port for accepting the detection signal Verr. If the CPU 11 has analog ports, the detection signal Verr may be an analog signal.

Figure 17:
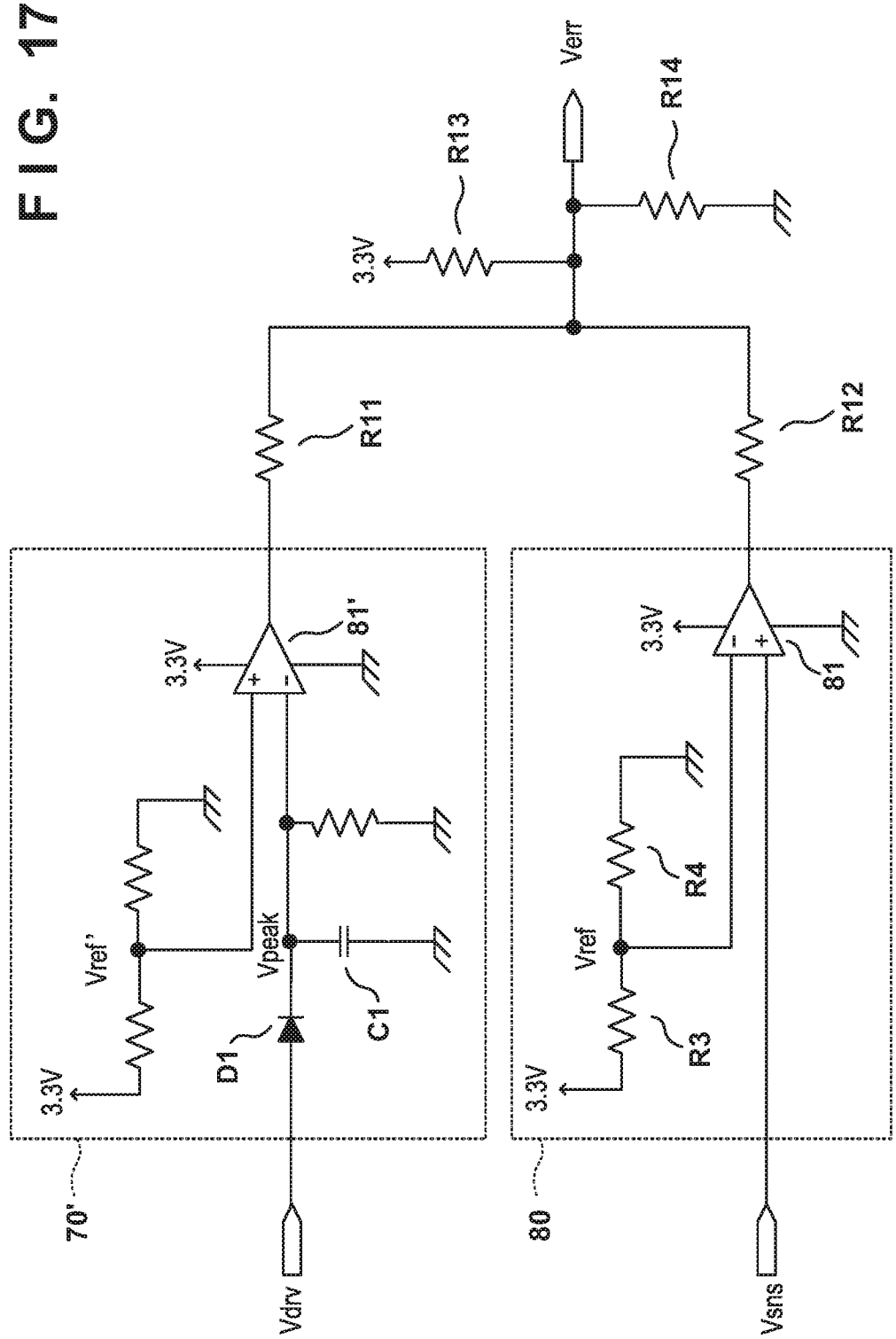
FIG. 17 is a circuit diagram for describing a different detection circuit.

FIG. 17 shows a detection circuit 60 for outputting an analog signal. In particular, the drive signal detection circuit 70' is provided with a comparator 81'. The comparator 81' compares Vpeak with the reference voltage Vref, and outputs a detection result indicating the presence or absence of the drive signal Vdrv. That is, if the drive signal Vdrv is present, 3.3V is output to the output terminal of the comparator 81'. In the absence of the drive signal Vdrv, the output terminal of the comparator 81' becomes a high impedance. The output terminal of the comparator 81' is connected to one end of a resistor R11. The other end of the resistor R11 is connected to one end of a resistor R12, one end of a resistor R13, and one end of a resistor R14. The other end of the resistor R12 is connected to the output terminal of the comparator 81. The other end of the resistor R13 is connected a 3.3V power supply. The other end of the resistor R14 is grounded. The current flowing through the resistors R11 to R14 differs depending on the combination of ON/OFF of the comparators 81 and 81'. The voltage of the detection signal Verr differs depending on the on/off combinations of the comparators 81 and 81'. Thus, the CPU 11 is derived from the voltage of the detection signal Verr. A combination of on/off of the comparators 81, 81' can be determined.

In the present embodiment, the drive signal detection circuit 70 is employed to detect a fault related to the drive signal. If, hypothetically, it is unnecessary to detect a fault related to the drive signal and it is necessary to detect a fault related to the control signal, the detection circuit 60 may include the output detection circuit 80.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-091614, filed May 14, 2019 which is hereby incorporated by reference herein in its entirety.

What is claimed is:

1. A power supply apparatus for outputting a voltage to be supplied to a load, the apparatus comprising:
   at least one processor configured to generate a control signal for setting a target voltage to be outputted and a drive signal for driving an element of the power supply apparatus to output the target voltage;
   a power supply circuit configured to, upon receiving the drive signal and the control signal, start generation of an output voltage based on the target voltage specified by the control signal; and
   a detection circuit configured to generate a detection signal used for determination of a fault related to the drive signal based on the drive signal and the output voltage outputted from the power supply circuit;

wherein the at least one processor:
- (i) starts to output of the drive signal before outputting the control signal,
- (ii) in a time period where the at least one processor outputs the drive signal and does not output the control signal, determines a fault related to the drive signal based on the detection signal outputted from the detection circuit, and
- (iii) in a case where a fault related to the drive signal is not detected, starts output of the control signal, and
- (iv) in a case where a fault related to the drive signal is detected, stops output of the drive signal.

2. The power supply apparatus according to claim 1, wherein the at least one processor is configured to determine that a fault related to the drive signal has occurred in a case where the output of the control signal is not started in a first time period after the output of the drive signal is started and in a case where a level of the detection signal does not change even once from a first level to a second level in the first time period.

3. The power supply apparatus according to claim 2, wherein the at least one processor is configured to determine that a fault related to the control signal or the power supply circuit has occurred in a case where the level of the detection signal changes from the first level to the second level during the first time period and the level of the detection signal returns from the second level to the first level at the end of the first time period.

4. The power supply apparatus according to claim 3, wherein the at least one processor is configured to start output of the control signal at the start of a second time period following the first time period,
wherein the at least on processor is configured, in a case where the level of the detection signal does not return from the second level to the first level by the end of the second time period, to determine that a fault related to the control signal or the power supply circuit has occurred, and
wherein the at least on processor is configured such that, in a case where the level of the detection signal returns from the second level to the first level by the end of the second time period, to determine that a fault related to the control signal and the power supply circuit has not occurred.

5. The power supply apparatus according to claim 4, wherein the at least one processor is configured to determine that a fault related to the drive signal, the control signal, or the power supply circuit has not occurred in a case where the level of the detection signal maintains the first level in a third time period after the second time period, and
wherein the at least one processor is configured to determine that a fault related to the drive signal, the control signal, or the power supply circuit has occurred in a case where the level of the detection signal becomes the second level in the third time period, with both the drive signal and the control signal being outputted in the third time period.

6. The power supply apparatus according to claim 2, wherein the at least one processor, in a case where the level of the detection signal does not change from the first level to the second level in a time period in which the output of the control signal is stopped while the output of the drive signal is continued, determines that a fault related to the drive signal, the control signal, or the power supply circuit has occurred.

7. The power supply apparatus according to claim 6, wherein the at least one processor, in a case where the level of the detection signal changes from the first level to the second level and the level of the detection signal returns from the second level to the first level in the time period in which the output of the control signal is stopped while the output of the drive signal is continued, determines that a fault related to the drive signal has occurred.

8. The power supply apparatus according to claim 7, wherein the at least one processor, in a case where the level of the detection signal is maintained at the second level at the end of the time period in which the output of the control signal is stopped while the output of the drive signal is continued, stops output of the drive signal, and
wherein, in a case where the level of the detection signal returns from the second level to the first level in a time period following the time period in which the output of the control signal is stopped while the output of the drive signal is continued, it is determined that a fault related to the drive signal, the control signal, or the power supply circuit has not occurred.

9. The power supply apparatus according to claim 8, wherein the at least one processor determines that a fault related to the drive signal has occurred in a case where the level of the detection signal is maintained at the second level at the end of the time period following the time period in which the output of the control signal is stopped while the output of the drive signal is continued.

10. The power supply apparatus according to claim 1, wherein the at least one processor is further configured to:
- (i) in a case where the detection signal indicates that a level of the drive signal is fixed to a predetermined level at a predetermined timing at which both the drive signal and the control signal are stopped, determine that a fault related to the drive signal has occurred, and
- (ii) in a case where the detection signal does not indicate that the level of the drive signal is fixed to the predetermined level, determine that a fault related to the drive signal has not occurred.

11. The power supply apparatus according to claim 1, wherein the power supply circuit includes:
a transformer,
a switching element configured to switch a primary side voltage applied to a primary side of the transformer based on the drive signal, and
a setting circuit configured to set a magnitude of the primary side voltage based on the control signal.

12. The power supply apparatus according to claim 11, wherein the detection circuit includes:
a first detection circuit configured to detect the drive signal,
a second detection circuit configured to detect the output voltage, and
a generation circuit configured to generate the detection signal based on a result of the detection by the first detection circuit and a result of the detection by the second detection circuit.

13. The power supply apparatus according to claim 12, wherein the generation circuit is configured to:
- (i) in a case where the output voltage is detected by the second detection circuit, output the detection signal at a first level without dependence on the result of the detection by the first detection circuit, and
- (ii) in a case where the output voltage is not detected by the second detection circuit, output the detection signal at a level in accordance with the result of the detection by the first detection circuit.

14. A power supply apparatus operable to output a voltage to be supplied to a load, the apparatus comprising:

at least one processor configured to generate a control signal for setting a target voltage to be outputted and generate a drive signal for driving an element of the power supply apparatus to output the target voltage;

a power supply circuit configured to, upon being inputted with the drive signal and the control signal, start generation of an output voltage based on the target voltage specified by the control signal; and a detection circuit configured to generate a detection signal to be used for determining, based on the drive signal and the output voltage outputted from the power supply circuit, a fault related to the drive signal, the control signal, or the power supply circuit, wherein the at least one processor is configured to execute a first sequence and a second sequence, in the first sequence the at least one processor determines occurrence of a fault related to the drive signal based on the detection signal outputted from the detection circuit at a predetermined timing at which both the drive signal and the control signal are stopped, and in the second sequence the at least one processor determines occurrence of a fault related to the drive signal, the control signal, and the power supply circuit in a first time period in which output of the drive signal starts and output of the control signal does not start, and determines occurrence of a fault related to the control signal and the power supply circuit in a second time period after the drive signal is output and output of the control signal is started.

15. The power supply apparatus according to claim 14, wherein the at least one processor is configured to execute a third sequence in which the at least one processor determines the occurrence of a fault related to the drive signal, the control signal, and the power supply circuit in a third time period in which the drive signal is continuously outputted and the control signal is continuously outputted.

16. The power supply apparatus according to claim 14, wherein the at least one processor is configured to execute a fourth sequence in which the at least one processor determines the occurrence of a fault related to the drive signal, the control signal, and the power supply circuit in a fourth time period in which the drive signal is continuously outputted and output of the control signal is stopped.

17. The power supply apparatus according to claim 16, wherein the fourth sequence includes stopping the output of the drive signal at the start of a fifth time period following the fourth time period, and determining occurrence of a fault related to the control signal and the power supply circuit in the fifth time period.

18. The power supply apparatus according to claim 14, wherein the at least one processor determines that a fault related to the drive signal has occurred in a case where a level of the detection signal in the first sequence is a second level.

19. The power supply apparatus according to claim 14, wherein the at least one processor, in the second sequence, determines that a fault related to the drive signal has occurred in a case where a level of the detection signal has not changed from a first level to a second level before the end of the first time period, determines that a fault related to the control signal or the power supply circuit has occurred in a case where the level of the detection signal has returned from the second level to the first level before the end of the first time period, and determines that fault related to the control signal or the power supply circuit has occurred in a case where the level of the detection signal has returned from the first level to the second level before the end of the second time period.

20. The power supply apparatus according to claim 15, wherein the at least one processor, in the third sequence, determines that a fault related to the drive signal, the control signal, or the power supply circuit has occurred in a case where a level of the detection signal has returned from a first level to a second level before the end of the third time period.

21. The power supply apparatus according to claim 17, wherein the at least one processor, in the fourth sequence, determines that a fault related to the drive signal, the control signal, or the power supply circuit has occurred in a case where a level of the detection signal has not changed from a first level to a second level before the end of the fourth time period, determines that a fault related to the drive signal has occurred in a case where the level of the detection signal has returned from the second level to the first level before the end of the fourth time period, and determines that a fault related to the drive signal has occurred in a case where the level of the detection signal has returned from the first level to the second level in the fifth time period.

22. The power supply apparatus according to claim 14, wherein the power supply apparatus is configured to supply power to an image forming apparatus, and wherein the first sequence is executed when the image forming apparatus starts a preparation operation for forming an image on a sheet, and the second sequence is executed during execution of the preparation operation.

23. A power supply apparatus for outputting a voltage to be supplied to a load, the apparatus comprising:

at least one processor configured to generate a control signal for setting a target voltage to be outputted, and a drive signal for driving an element of the power supply apparatus to output the target voltage;

a power supply circuit configured to, upon being inputted with the drive signal and the control signal, start generation of an output voltage based on the target voltage that is designated in accordance with the control signal; and a detection circuit configured to generate a detection signal to be used for determining, based on the drive signal and the output voltage outputted from the power supply circuit, a fault related to the drive signal, the control signal, or the power supply circuit, wherein the at least one processor determines the presence or absence of a fault related to the drive signal, the control signal, or the power supply circuit based on the detection signal outputted from the detection circuit, wherein the at least one processor in a time period where output of the drive signal starts before the control signal and the control signal is not output determines a fault related to the drive signal based on the detection signal outputted from the detection circuit, wherein the power supply circuit includes:
a transformer,
a switching element configured to switch a primary side voltage applied to a primary side of the transformer based on the drive signal, and
a setting circuit configured to set a magnitude of the primary side voltage based on the control signal, and wherein the detection circuit includes:
a first detection circuit configured to detect the drive signal, a second detection circuit configured to detect the output voltage, and a generation circuit configured to generate the detection signal based on a detection result of the first detection circuit and a detection result of the second detection circuit.

24. The power supply apparatus according to claim 23, wherein the power supply circuit and the detection circuit are mounted to a first substrate, and the at least one processor is mounted to a second substrate.

25. An image forming apparatus comprising:

a power supply apparatus; and an image forming unit configured to use an output of the power supply apparatus to form an image on a sheet, wherein the power supply apparatus comprises:

at least one processor configured to generate a control signal for setting a target voltage to be outputted and a drive signal for driving an element of the power supply apparatus to output the target voltage;

a power supply circuit configured to, upon receiving the drive signal and the control signal, start generation of an output voltage based on the target voltage specified by the control signal; and a detection circuit configured to generate a detection signal used for determination of a fault related to the drive signal based on the drive signal and the output voltage outputted from the power supply circuit, wherein the at least one processor in a time period where output of the drive signal starts before the control signal and the control signal is not output determines a fault related to the drive signal based on the detection signal outputted from the detection circuit, and wherein, in a case where a fault related to the drive signal is not detected, the at least one processor starts output of the control signal, and in a case where a fault related to the drive signal is detected, stops output of the drive signal.

* * * * *